US008296284B2

(12) United States Patent
Bierner

(10) Patent No.: US 8,296,284 B2
(45) Date of Patent: Oct. 23, 2012

(54) GUIDED NAVIGATION SYSTEM

(75) Inventor: Gann Alexander Bierner, Oakland, CA (US)

(73) Assignee: Oracle International Corp., Redwood Shores, CA (US)

( * ) Notice: Subject to any disclaimer, the term of this patent is extended or adjusted under 35 U.S.C. 154(b) by 0 days.

(21) Appl. No.: 13/005,459

(22) Filed: Jan. 12, 2011

(65) Prior Publication Data

US 2011/0131210 A1   Jun. 2, 2011

Related U.S. Application Data

(63) Continuation of application No. 11/382,670, filed on May 10, 2006, now Pat. No. 7,921,099.

(51) Int. Cl.
*G06F 17/00* (2006.01)
*G06F 7/00* (2006.01)

(52) U.S. Cl. .......................... 707/708; 707/711

(58) Field of Classification Search .............. 707/708, 707/731
See application file for complete search history.

(56) References Cited

U.S. PATENT DOCUMENTS

| 4,956,774 | A | * | 9/1990 | Shibamiya et al. ............ 1/1 |
| 5,321,833 | A | | 6/1994 | Chang et al. |
| 5,357,436 | A | | 10/1994 | Chiu |
| 5,386,556 | A | | 1/1995 | Hedin et al. |
| 5,442,782 | A | | 8/1995 | Malatesta et al. |
| 5,535,382 | A | | 7/1996 | Ogawa |
| 5,608,624 | A | | 3/1997 | Luciw |
| 5,625,814 | A | | 4/1997 | Luciw |
| 5,694,523 | A | | 12/1997 | Wical |
| 5,694,546 | A | | 12/1997 | Reisman |
| 5,742,816 | A | | 4/1998 | Barr et al. |
| 5,794,050 | A | | 8/1998 | Dahlgren et al. |
| 5,812,865 | A | | 9/1998 | Theimer et al. |
| 5,826,269 | A | | 10/1998 | Hussey |
| 5,848,399 | A | | 12/1998 | Burke |
| 5,873,056 | A | | 2/1999 | Liddy et al. |
| 5,873,076 | A | | 2/1999 | Barr et al. |
| 5,873,080 | A | | 2/1999 | Coden et al. |

(Continued)

FOREIGN PATENT DOCUMENTS

WO       01/88662 A2    11/2001

(Continued)

OTHER PUBLICATIONS

Baeza-Yates et al., "Query Recommendation Using Query Logs in Search Engines", Mar. 2004, Current Trends in Database Technology—EDBT 2004 Workshops, pp. 588-596.

(Continued)

*Primary Examiner* — Jacob F Bétit
*Assistant Examiner* — John Hocker
(74) *Attorney, Agent, or Firm* — Kilpatrick Townsend & Stockton LLP

(57) ABSTRACT

A navigation system is used in combination with a data retrieval system to more effectively locate the correct answers or information in search content. The navigation system provides taxonomies that identify different information categories and sub-categories (facets). Classifiers automatically classify the search content by identifying the content corresponding with associated facets. The facets, in conjunction with the associated classifiers, provide robust classification and correlation between both structured and unstructured content. Rules can be used in conjunction with the facets and classifiers to automatically control different navigation operations. The navigation system can also leverage ontologies to dynamically create taxonomies and provides unique facet expansion and intra-document classification operations.

19 Claims, 17 Drawing Sheets

U.S. PATENT DOCUMENTS

| | | | |
|---|---|---|---|
| 5,878,423 | A | 3/1999 | Anderson et al. |
| 5,884,302 | A | 3/1999 | Ho |
| 5,890,152 | A | 3/1999 | Rapaport et al. |
| 5,893,091 | A | 4/1999 | Hunt et al. |
| 5,897,622 | A | 4/1999 | Blinn et al. |
| 5,901,287 | A | 5/1999 | Bull et al. |
| 5,913,215 | A | 6/1999 | Rubinstein et al. |
| 5,933,822 | A | 8/1999 | Braden-Harder et al. |
| 5,948,054 | A | 9/1999 | Nielsen |
| 5,963,940 | A | 10/1999 | Liddy et al. |
| 5,966,695 | A | 10/1999 | Melchione et al. |
| 5,974,392 | A | 10/1999 | Endo |
| 5,974,412 | A | 10/1999 | Hazlehurst et al. |
| 5,987,454 | A | 11/1999 | Hobbs |
| 5,995,921 | A | 11/1999 | Richards et al. |
| 6,006,225 | A | 12/1999 | Bowman et al. |
| 6,016,476 | A | 1/2000 | Maes et al. |
| 6,021,403 | A | 2/2000 | Horvitz et al. |
| 6,026,388 | A | 2/2000 | Liddy et al. |
| 6,028,601 | A | 2/2000 | Machiraju et al. |
| 6,038,560 | A | 3/2000 | Wical |
| 6,052,710 | A | 4/2000 | Saliba et al. |
| 6,061,057 | A | 5/2000 | Knowlton et al. |
| 6,070,149 | A | 5/2000 | Tavor et al. |
| 6,078,914 | A | 6/2000 | Redfern |
| 6,094,652 | A | 7/2000 | Faisal |
| 6,151,600 | A | 11/2000 | Dedrick |
| 6,208,991 | B1 | 3/2001 | French et al. |
| 6,233,547 | B1 | 5/2001 | Denber |
| 6,260,035 | B1 | 7/2001 | Horvitz et al. |
| 6,278,996 | B1 | 8/2001 | Richardson et al. |
| 6,282,534 | B1 | 8/2001 | Vora |
| 6,285,998 | B1 | 9/2001 | Black et al. |
| 6,370,535 | B1 | 4/2002 | Shapiro et al. |
| 6,385,592 | B1 | 5/2002 | Angles et al. |
| 6,393,479 | B1 | 5/2002 | Glommen et al. |
| 6,401,084 | B1 | 6/2002 | Ortega et al. |
| 6,401,094 | B1 | 6/2002 | Stemp et al. |
| 6,405,190 | B1 | 6/2002 | Conklin |
| 6,466,899 | B1 | 10/2002 | Yano et al. |
| 6,471,521 | B1 | 10/2002 | Dornbush et al. |
| 6,477,551 | B1 | 11/2002 | Johnson et al. |
| 6,480,843 | B2 | 11/2002 | Li |
| 6,564,213 | B1 | 5/2003 | Ortega et al. |
| 6,584,464 | B1 | 6/2003 | Warthen |
| 6,675,159 | B1 | 1/2004 | Lin et al. |
| 6,766,320 | B1 | 7/2004 | Wang et al. |
| 6,907,414 | B1 | 6/2005 | Parnell |
| 6,928,425 | B2 | 8/2005 | Grefenstette et al. |
| 6,941,301 | B2 | 9/2005 | Ferguson et al. |
| 6,944,711 | B2* | 9/2005 | Mogi et al. ............ 711/113 |
| 6,957,213 | B1 | 10/2005 | Yuret |
| 7,024,400 | B2 | 4/2006 | Tokuda et al. |
| 7,035,864 | B1 | 4/2006 | Ferrari et al. |
| 7,035,910 | B1 | 4/2006 | Dutta et al. |
| 7,111,290 | B1 | 9/2006 | Yates, Jr. et al. |
| 7,117,207 | B1 | 10/2006 | Kerschberg et al. |
| 7,177,795 | B1 | 2/2007 | Chen et al. |
| 7,181,731 | B2 | 2/2007 | Pace et al. |
| 7,209,921 | B2 | 4/2007 | Pace et al. |
| 7,254,806 | B1 | 8/2007 | Yates, Jr. et al. |
| 7,428,541 | B2 | 9/2008 | Houle |
| 7,668,850 | B1 | 2/2010 | Bierner |
| 7,672,951 | B1 | 3/2010 | Bierner |
| 7,676,517 | B2 | 3/2010 | Hurst-Hiller et al. |
| 7,747,601 | B2 | 6/2010 | Cooper et al. |
| 7,921,099 | B2 | 4/2011 | Bierner |
| 8,082,264 | B2 | 12/2011 | Bierner |
| 2001/0014888 | A1* | 8/2001 | Tsuchida et al. ............ 707/2 |
| 2001/0047270 | A1 | 11/2001 | Gusick et al. |
| 2002/0049738 | A1 | 4/2002 | Epstein |
| 2002/0051020 | A1* | 5/2002 | Ferrari et al. ............ 345/854 |
| 2002/0078090 | A1 | 6/2002 | Hwang et al. |
| 2002/0103809 | A1 | 8/2002 | Starzl et al. |
| 2003/0014403 | A1 | 1/2003 | Chandrasekar et al. |
| 2003/0018512 | A1 | 1/2003 | Dortmans |
| 2003/0037073 | A1 | 2/2003 | Tokuda et al. |
| 2003/0101153 | A1 | 5/2003 | Francis et al. |
| 2003/0144994 | A1 | 7/2003 | Wen et al. |
| 2003/0204435 | A1 | 10/2003 | McQuilkin et al. |
| 2003/0217052 | A1 | 11/2003 | Rubenczyk et al. |
| 2003/0233224 | A1 | 12/2003 | Marchisio et al. |
| 2004/0024739 | A1 | 2/2004 | Copperman et al. |
| 2004/0167870 | A1 | 8/2004 | Wakefield et al. |
| 2005/0080775 | A1 | 4/2005 | Colledge et al. |
| 2005/0120045 | A1* | 6/2005 | Klawon ............ 707/102 |
| 2005/0149496 | A1 | 7/2005 | Mukherjee et al. |
| 2005/0198563 | A1 | 9/2005 | Kristjansson |
| 2005/0203878 | A1 | 9/2005 | Brill et al. |
| 2005/0234969 | A1* | 10/2005 | Mamou et al. ............ 707/102 |
| 2005/0267871 | A1 | 12/2005 | Marchisio et al. |
| 2006/0059073 | A1 | 3/2006 | Walzak |
| 2006/0074836 | A1 | 4/2006 | Gardner et al. |
| 2006/0095326 | A1 | 5/2006 | Sandhu et al. |
| 2006/0106769 | A1 | 5/2006 | Gibbs |
| 2006/0122979 | A1 | 6/2006 | Kapur et al. |
| 2006/0136403 | A1 | 6/2006 | Koo |
| 2006/0173724 | A1 | 8/2006 | Trefler et al. |
| 2006/0179404 | A1 | 8/2006 | Yolleck et al. |
| 2006/0253427 | A1 | 11/2006 | Wu et al. |
| 2006/0259483 | A1 | 11/2006 | Ozana |
| 2006/0265232 | A1 | 11/2006 | Katariya et al. |
| 2007/0033116 | A1 | 2/2007 | Murray |
| 2007/0208738 | A1 | 9/2007 | Morgan |
| 2007/0282769 | A1 | 12/2007 | Bierner |
| 2008/0104037 | A1 | 5/2008 | Bierner |
| 2008/0189163 | A1 | 8/2008 | Rosenberg et al. |
| 2008/0215976 | A1 | 9/2008 | Bierner et al. |
| 2008/0243761 | A1* | 10/2008 | Guo et al. ............ 707/2 |
| 2008/0294651 | A1 | 11/2008 | Masuyama et al. |
| 2009/0077047 | A1 | 3/2009 | Cooper et al. |
| 2009/0083224 | A1* | 3/2009 | Dettinger et al. ............ 707/3 |
| 2009/0089044 | A1 | 4/2009 | Cooper et al. |
| 2010/0205180 | A1 | 8/2010 | Cooper et al. |

FOREIGN PATENT DOCUMENTS

| WO | 02/35376 A2 | 5/2002 |
|---|---|---|
| WO | 2007/134128 A2 | 11/2007 |
| WO | 2008/022150 A2 | 2/2008 |
| WO | 2008/067316 A2 | 6/2008 |

OTHER PUBLICATIONS

Author Unknown, "L.L. Bean Home Page," L.L. Bean, Inc., 2000, [retrieved on Aug. 19, 2009], 1 page. Retrieved from: http://web.archive.org/web/20000229033021/http://llbean.com/.

Author Unknown, "L.L. Bean Home Page," L.L. Bean, Inc., 2000, [retrieved on Aug. 19, 2009], 1 page. Retrieved from: http://web.archive.org/web/20000229072041/http://llbean.com/.

Author Unknown, "L.L. Bean Home Page," L.L. Bean, Inc., 2000, [retrieved on Aug. 19, 2009], 1 page. Retrieved from: http://web.archive.org/web/20000229132929/http://llbean.com/.

Chien, S., et al., "Semantic Similarity Between Search Engine Queries Using Temporal Correlation," Proceedings of the 14th International Conference on World Wide Web, May 10-14, 2005 [retrieved on Jan. 21, 2008], 10 pages. Retrieved from: http://www.ra.ethz.ch/CDstore/www2005/docs/p2.pdf.

Clark, D., "AnswerFriend Seeks to Sell Question-Answering Software," Wall Street Journal, Aug. 24, 2000, [retrieved on Jan. 9, 2002], 3 pages. Retrieved from: http://webreprints.djreprints.com/0000000000000000018148001.html.

International Preliminary Examination Report of PCT/US2001/015711 dated Feb. 16, 2005, 5 pages.

International Preliminary Report on Patentability and Written Opinion of the International Searching Authority of PCT/US2007/068597 dated Nov. 11, 2008, 4 pages.

International Preliminary Report on Patentability and Written Opinion of the International Searching Authority of PCT/US2007/075929 dated Feb. 17, 2009, 8 pages.

International Preliminary Report on Patentability and Written Opinion of the International Searching Authority of PCT/US2007/085646 mailed on Jun. 3, 2009, 7 pages.

International Search Report of PCT/US2001/015711 mailed on Nov. 6, 2001, 4 pages.

International Search Report of PCT/US2007/068597 mailed on Jul. 1, 2008, 1 page.

International Search Report of PCT/US2007/075929 mailed on Mar. 12, 2008, 1 page.

International Search Report of PCT/US2007/085646 mailed on Jul. 23, 2008, 1 page.

Katz, B., et al., "Integrating Web Resources and Lexicons into a Natural Language Query System," Proceedings on IEEE International Conference on Multimedia Computing and Systems, vol. 2, 1999, pp. 255-261.

Madhavan, J., et al., "Semantic Mappings for Data Mediation," Feb. 2002, 17 pages. Retrieved from: http://pages.cs.wisc.edu/~anhai/talks/JauantMadhavan-Affiliates2002.ppt.

Raghavan, S., et al., "Crawling the Hidden Web," Computer Science Department, Stanford University, 2001, pp. 1-25, especially pp. 1-15.

Storey, V., et al., "The Role of User Profiles in Context-Aware Query Processing for the Semantic Web," *Proceedings of the 9th International Conference on Applications of Natural Language to Information Systems*, Jun. 2004, 13 pages.

Yuret, D., "Discovery of Linguistic Relations Using Lexical Attraction," Doctoral Thesis, Department of Electrical Engineering and Computer Science, Massachusetts Institute of Technology, May 15, 1998, [retrieved on Feb. 5, 2002], 42 pages. Retrieved from: http://www.ai.mit.edu/people/deniz/publications/yuretphd/main.html.

Yuret, D., "Lexical Attraction Models of Language," MIT Artificial Intelligence Laboratory, no date, 7 pages.

Zaiane, O., et al., "Finding Similar Queries to Satisfy Searches Based on Query Traces," Advances in Object-Oriented Information Systems, Lecture Notes in Computer Science, Springer-Verlag Berlin Heildelberg, 2002, [retrieved on 11-182010], pp. 207-216. Retrieved from: http://www.springerlink.com/content/h2ukf5jflymp6dr7/fulltext.pdf.

* cited by examiner

GUIDED NAVIGATION SYSTEM

The present application is a continuation of U.S. patent application Ser. No. 11/382,670, filed May 10, 2006, entitled: "GUIDED NAVIGATION SYSTEM" which is incorporated by reference in its entirety.

BACKGROUND

Current search engines receive a search request entered by a user and then identify and present the search results back to the search requester via a User Interface (UI). The search results may be ranked in some order based on, for example, the presence of important words or concepts in the identified documents.

Unfortunately, these search and display techniques often do not efficiently organize the information sought by the searcher. For example, the information or document sought by the user may be buried in one of the many different documents or data returned in the search results. The user is then required to manually open and read dozens, if not hundreds, of the data items returned from the search results before identifying the correct, or most pertinent document.

In yet another situation, the search requester may not know the correct search terms needed to direct or narrow a search to discover the desired document or information. Thus, the user is relegated to conducting multiple different time-consuming searches attempting to locate the correct group of documents or information. The user has to then wade through all of the results from each search until a particular document or piece of information is discovered.

The present invention addresses this and other problems associated with the prior art.

SUMMARY OF THE INVENTION

A navigation system is used in combination with a data retrieval system to more effectively locate the correct answers or information in search content. The navigation system provides taxonomies that identify different information categories and sub-categories (facets). Classifiers automatically classify the search content by identifying the content corresponding with associated facets. The facets, in conjunction with the associated classifiers, provide robust classification and correlation between both structured and unstructured content. Rules can be used in conjunction with the facets and classifiers to automatically control different navigation operations. The navigation system can also leverage ontologies to dynamically create taxonomies and provide unique facet expansion and intra-document classification operations.

The foregoing and other objects, features and advantages of the invention will become more readily apparent from the following detailed description of a preferred embodiment of the invention which proceeds with reference to the accompanying drawings.

DETAILED DESCRIPTION

Figure 1:
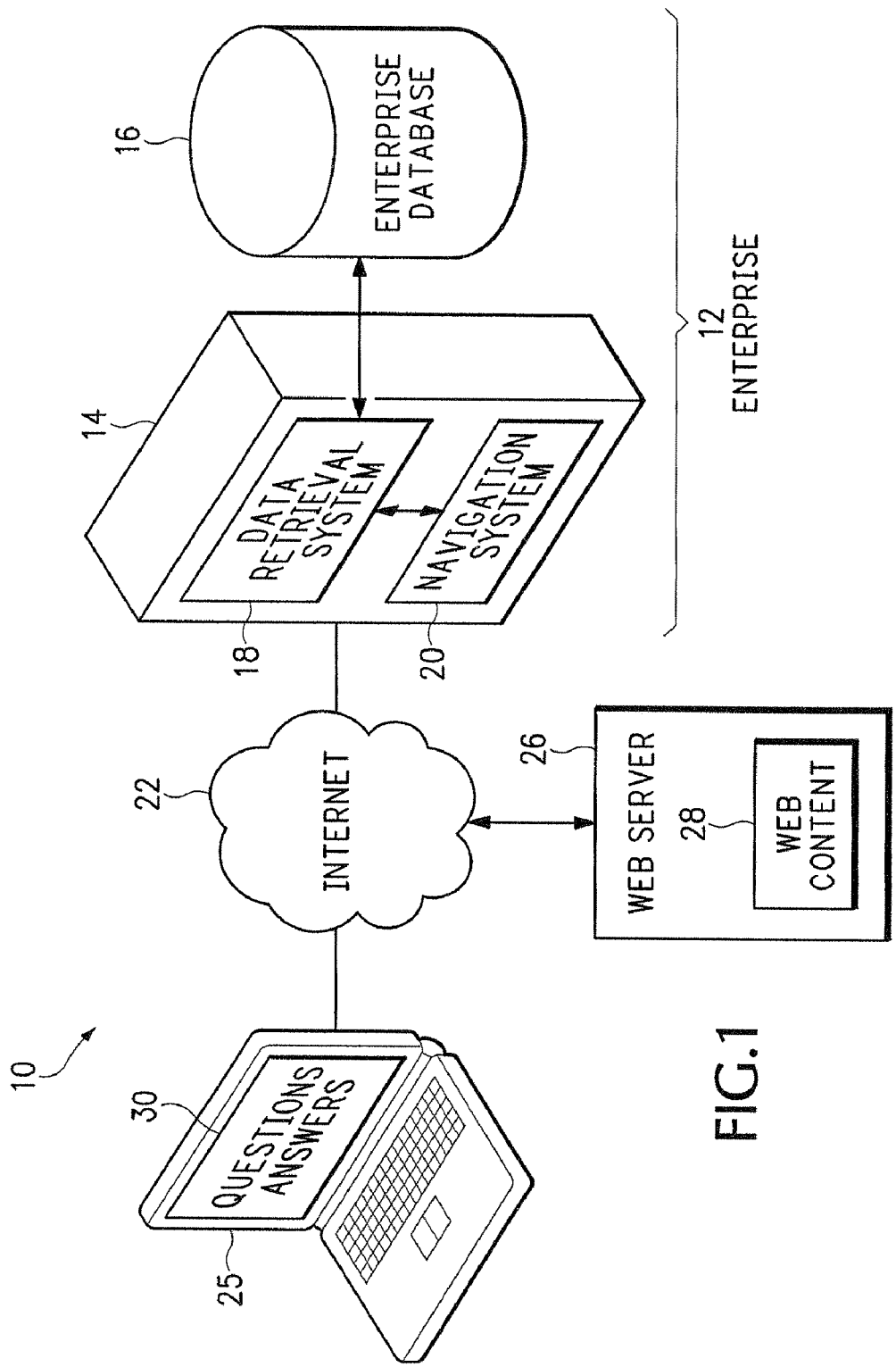
FIG. 1 is a block diagram of a network that uses a guided navigation system.

FIG. 1 shows a computer network system 10 that includes an enterprise 12 that has one or more enterprise servers 14 and one or more enterprise databases 16 that contain content associated with enterprise 12. For example, the enterprise 12 may be an on-line retailer that sells books as well as other retail items. In this example, the enterprise database 16 may contain a price list for all of the books available for purchase. In another example, the enterprise 12 may be associated with a car manufacturer or car dealership and the enterprise database 16 could include vehicle information. These are, of course, just two examples, and any type of business or entity is represented by enterprise 12.

Other web servers 26 may operate outside of the enterprise 12 and may include associated web files or other web content 28. Examples of content stored in enterprise database 16 and in file server 28 may include HTML web pages, PDF files, Word® documents, structured database information or any other type of electronic content that can contain essentially any type of information.

Some of the information may be stored in a structured format referred to generally as structured content. For example, data may be stored in the enterprise database 16 in a preconfigured format specified for enterprise 12. For example, a book or vehicle price list may be considered structured content. Alternatively, other information that is contained in enterprise database 16, or contained on other web servers 26, may be considered non-structured content. This may include HTML web pages, text documents, or any other type of free flowing text or data that is not organized in a preconfigured data format known by the navigation system 20.

A search query may be initiated from a terminal 25 through a User Interface (UI) 30. The terminal 25 in one example may be a Personal Computer (PC), laptop computer 24, wireless Personal Digital Assistant (PDA), cellular telephone, or any other wired or wireless device that can access and display content over a packet switched network. In this example, the search query is initiated from the UI 30 and transported over the Internet 22 to the enterprise server 14. The enterprise server 14 operates a data retrieval system 18 that may search for both structured and/or non-structured content either in the enterprise database 16 or web server 26 pursuant to the query initiated in UI 30.

A novel navigation system 20 is then used to classify and navigate through the search results provided by the data retrieval system 18. The information as classified by the navigation system 20, along with other taxonomy information, is then displayed on the UI 30.

The enterprise server 14 includes one or more processors that are configured to operate the data retrieval system and navigation system 20. The operations performed by the navigation system could be provided by software computer instructions that are stored in a computer readable storage medium, such as memory on server 14. The instructions are then executed by a processor in server 14.

It should be understood that the examples presented below are used for illustrative purposes only and the scope of the invention is not limited to any of the specific examples described below.

Classification of Content

Figure 2:
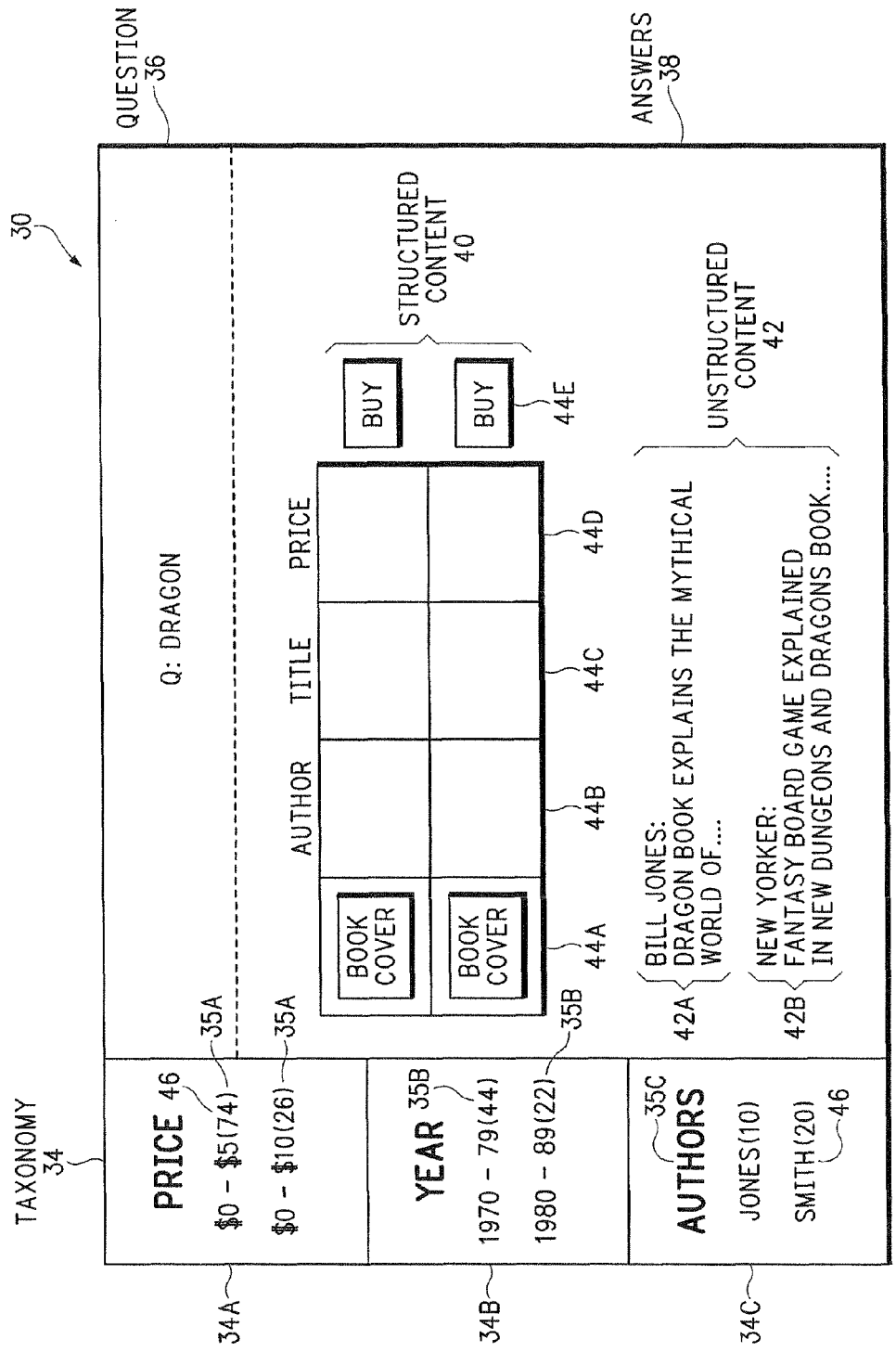
FIG. 2 is a diagram of a User Interface (UI) that is used with the navigation system shown in FIG. 1.

FIG. 2 shows the User Interface (UI) 30 that displays the output from the navigation system 20 shown in FIG. 1. The UI 30 includes a section where a user can ask a question 36. In this example, the user inputs the text DRAGON in an attempt to locate a book related somehow to dragons. For example, the subject matter, title, author, etc., of a book may include the name or relate to dragons.

The data retrieval system 18 in FIG. 1 conducts a search in the enterprise database 16, and possibly in other external web servers 26, for content related to the DRAGON question 36. The results of the search are displayed on UI 30 as answers 38. In this example, the answers 38 include both structured content 40 and possibly unstructured content 42. As described above, the structure content 40 may include information that is preconfigured into predefined fields. For example, each entry in a book list contained in the enterprise database 16 may contain a cover field 44A that shows the cover of the book, an author field 44B that identifies the book's author, a title field 44C that identifies the book title, and a price field 44D that identifies the book price. The content for each one of these fields for books that satisfy question 36 are displayed as structured content answers 40. Each structured content answer 40 could also contain a buy button field 44E used for purchasing the book.

The answers 38 may also contain unstructured content 42 that may not have predefined data fields. For example, a first book review 42A may have been located somewhere in the enterprise database 16 or on a web server 27 and may describe a book related in some way to the question DRAGON. Similarly, another review 42B may be identified on the enterprise database 16 or on another web server 26 that is somehow also related to the DRAGON question 36. This content 42 is considered unstructured or "free-flowing" because the content is not presented in any particular preconfigured format. For example, the reference to a book related to DRAGON may be located anywhere in the book reviews 42A and 42B.

Of particular interest in the UI 30 is the display of a taxonomy 34 that identifies different classifications and sub-classifications for the content in answers 38. These classifications and sub-classifications are alternatively referred to as facets. In this example, the taxonomy 34 includes a first price taxonomy 34A that includes a first set of facets 35A that are associated with book prices, a second year taxonomy 34B that includes a set of facets 35B associated with book publication dates, and a third author taxonomy 34C that includes a set of facets 35C associated with book authors.

Different taxonomies 34 may be preconfigured in the navigation system 20. The taxonomies 34 associated with question 36, or with a particular enterprise, are selected by the navigation system, or the user, and displayed in UI 30. In some applications, some or all of the taxonomy is dynamically generated by the navigation system. This will be described in more detail below.

An associated number 46 may be displayed that indicates the number of content items 40 and 42 that correspond with a particular facet 35. For example, the search results (answers 38) for DRAGON may have produced a total of 74 structured content items 40 and/or unstructured content items 42 related to DRAGON books in a price range between $0-$5. Similarly, the navigation system 20 may have identified a combination of twenty-two structured content items 40 and/or unstructured content items 42 related to books published between 1980 and 1989. A process referred to as classification automatically classifies the content used to produce the answers 38 with different facets 35 in taxonomy 34. Classification is also described in more detail below.

When a user selects one of the facets 35 in taxonomy 34, the navigation system 20 automatically displays the structured and unstructured content 40 and 42, respectively, classified for the selected facet 35. For example, selecting the $5-$10 facet 35A causes the navigation system to display twenty-six answers 38 that are all associated somehow with dragon books within a price range of $5-$10.

Taxonomies

Figure 3:
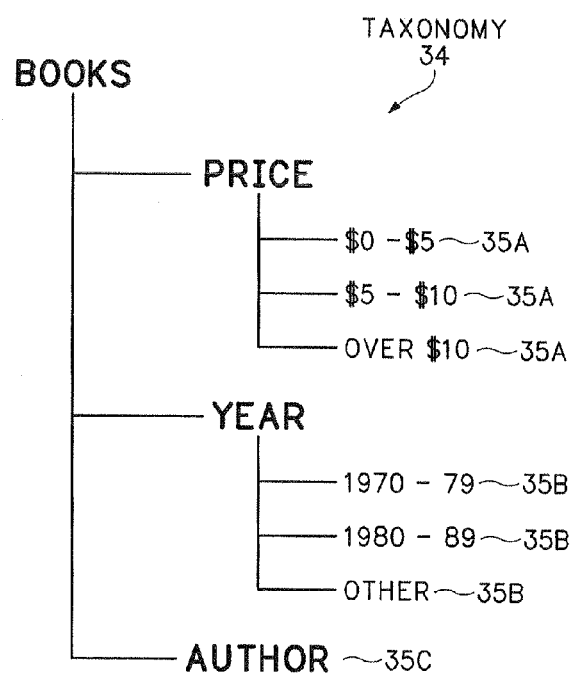
FIG. 3 is a diagram showing a partial example taxonomy.

FIG. 3 shows some of the taxonomies 34 from FIG. 2 in more detail. A taxonomy is a hierarchical representation of content based on some feature (e.g., price, genre, publication year, etc). Content objects such as documents, sentences, database entries, etc are associated with items of the taxonomy (facets) using classifiers. For any given item in the taxonomy 34, all objects classified in that item (facet) 35 can be implicitly classified for all ancestor items in the taxonomy. For example, in the taxonomy below, every Fantasy book is also a Speculative book and also a Fiction book.

Taxonomy:
Genre
   Fiction
      Mystery
      Romance
      Speculative
         Science Fiction
         Fantasy
   Non Fiction
      Biography
      History
      Science As mentioned above, a facet 35 is another name for an item in a taxonomy (a "taxonomy item"). The facets 35 can be referred to by a string constructed from the names of the facets along the path from the root of taxonomy to the facet. For example, each name may be separated by a period, ".", and all other periods may be preceded by a backslash. For example, the 1980-89 facet in FIG. 3 might be referred to as "Books.Year.1980-89."

Seamless Association of Structured and Unstructured Content

Figure 4:
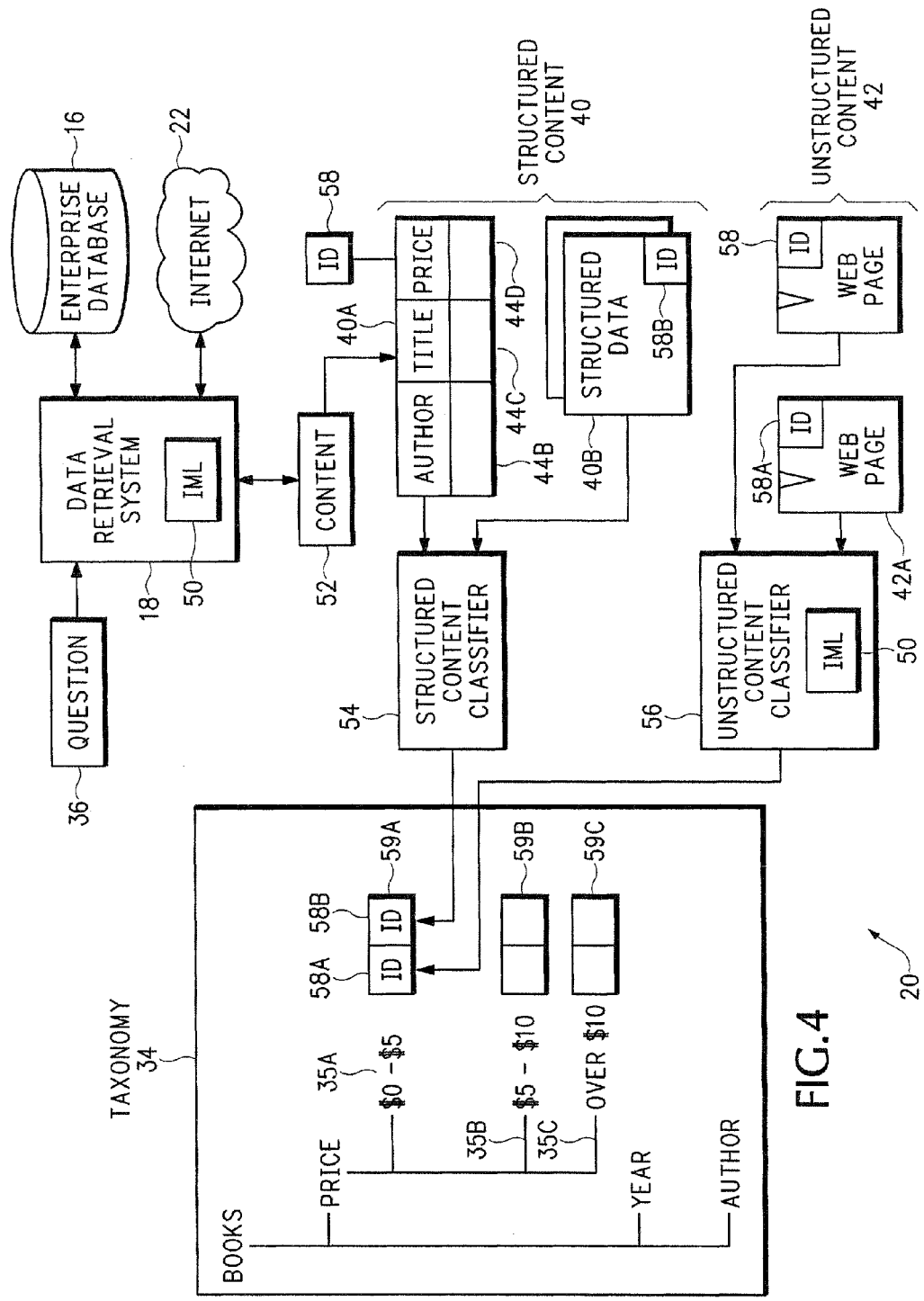
FIG. 4 is a block diagram showing a partial taxonomy and classifiers used in the navigation system.

FIG. 4 shows how classifiers are used to provide seamless association of different structured and unstructured content with the same facets. Many systems allow navigation through structured data, such as e-commerce sites. However, the navigation system 20 provides classification of both structured content 40 and unstructured content 42, such as web content 28 (FIG. 1).

In FIG. 4, the question 36 is entered through the UI 30 shown in FIG. 2. The question 36 in one embodiment is analyzed by the data retrieval system 18 that may use an Intelligent Matching Language (IML) 50. The operation of IML 50 for retrieving data is described in co-pending patent application Ser. No. 10/820,341, filed Apr. 7, 2004, entitled: AN IMPROVED ONTOLOGY FOR USE WITH A SYSTEM, METHOD, AND COMPUTER READABLE MEDIUM FOR RETRIEVING INFORMATION AND RESPONSE TO A QUERY, which is herein incorporated by reference.

Briefly, the IML 50 allows content searching for documents that contain the same "concept" that is described in the question 36, for example. The navigation system 20 then provides navigation of the content provided by the IML 50 or can be used with any other data retrieval system that does not use IML 50.

As described above in FIG. 1, the data retrieval system 18 obtains content 52 either from databases 16 associated with the enterprise 12 (FIG. 1) or from other non-enterprise locations via Internet 22. The content 52 can be any type of electronic information that may relate to the question 36. For example, the content 52 may be a Microsoft® Word®, PDF, Powerpoint®, HTML, RTF, or DBASE document, etc., or any other type of document, text, or data item that contains information associated with question 36. These of course are only examples of data formats and it should be understood that the content 52 can be any type of electronically captured data or text identified by data retrieval system 18.

As previously mentioned in FIG. 2, the content 52 may include both structured content 40 and unstructured content 42. The structured content 40 has predefined data fields 44. In the book example, the data fields 44 in structured content 40A may contain the book author, book title, and book price. Other structured content 40B may also be contained in content 52 that has a different prefigured data structure. As also mentioned above, the unstructured content 42 may simply be free flowing text or some other text or data that is not presented in a predefined structured format.

The navigation system 30 uses classifiers 54 and 56 to seamlessly associate both the structured content 40 and the unstructured content 42 with the same associate facets 35. The taxonomy 34 by itself is just an association of classification items and has no direct connection to the content 52. The connection between content 52 and specific facets 35 is provided by the classifiers 54 and 56. These classifiers 54 and 56 include procedures that identify the pieces of content 52 that are associated with particular facets 35.

For example, the structured content classifier 54 may be associated with price facet 35A that identifies a book price range category of $0-$5. Accordingly, the structured classifier 54 may include procedures that access the price field 44D in structured content 40A and identifies any books with a price between $0-$5.

Of particular interest is the association of the structured classifier 54 and the unstructured classifier 56 with the same facet 35A. Unstructured classifier 56 includes procedures that parse through the unstructured content 42 for any documents that may indicate a book price in a range between $0-$5. For example, the unstructured content classifier 56 may parse through web pages to identify metadata that refers to a book having a price between $0-$5.

In one example, each piece of content 52 is assigned an associated Identifier (ID) 58 during the data retrieval process by data retrieval system 18. Upon identifying content 52 corresponding with the associated facet 35, the classifiers 54 and 56 then load the document ID 58 for the identified content into an associated facet list 59A. There are ID lists 59A-59C associated with each facet. In this example, the unstructured document 42A is identified by unstructured classifier 56 as associated with facet 35A and the associated ID 58A entered into list 59A. Similarly, the structured document 40B is identified by structured classifier 54 as associated with facet 35A and the associated ID 58B entered into facet list 59A.

When the taxonomy 34 is displayed on UI 30 in FIG. 2, the number of content IDs for both structured and unstructured content that are possible results for the user's query are counted and displayed as document numbers 46 in FIG. 2. Thus, both structured and unstructured content 40 and 42, respectively, is seamlessly associated with the same facet 35 using classifiers 54 and 56.

It should be understood that any combination of different classifiers 54 and 56 can be associated with any combination of facets 35. In the example above, both a structured classifier 54 and an unstructured classifier 56 are each associated with a same facet 35A. However, there could be additional structured or unstructured classifiers associated with the same facet 35A. For example, facet 35A may use another, different structured classifier to classify other structured content 40B. Further, other types of unstructured classifiers may be associated with facet 35A to parse through different types of unstructured content 42.

There also may be one classifier associated with multiple different facets 35. For example, a classifier may be abstracted to identify any content 52 that indicates a book price. A taxonomy builder used by the classifier may then further refine classification of the identified content down to specific price ranges associated with the different price facets 35A, 35B, and 35C. This is described in more detail below.

In another embodiment, a same classifier may include procedures for identifying facet related content in both the structured and unstructured content 40 and 42, respectively. However there may be advantages to using separate structured and unstructured classifiers such as reduced software modification and increased software efficiency for different structured and unstructured data formats.

Some of the classifiers, such as unstructured classifier 56 may also use the IML 50 to more effectively identify content 52 associated with a particular facet 35. For example, the intelligent association of different concepts with a particular facet 35 allows the classifier 56 to identify content 42 that may not necessarily use the exact same words used in the facet. For instance, the IML 50 in unstructured classifier 56 may be used to identify unstructured content 42 that contains a book price but does not necessarily use the symbol "$", or use the word "dollar". For example, the IML 50 may associate the symbol "$" and the word "dollar" with the words "Euro", "bucks", "cost", "Yen", etc. The facet 35 may then simply apply a concept such as <dollar> or <price>. The IML 50 in classifier 56 which then automatically identifies any other documents that contain words associated with the <price> concept.

The classifiers in this example are associated with book information. But, of course, as previously mentioned above, the taxonomy, facets and associated classifiers are adaptable to any subject matter.

Taxonomy Builder

Figure 5:
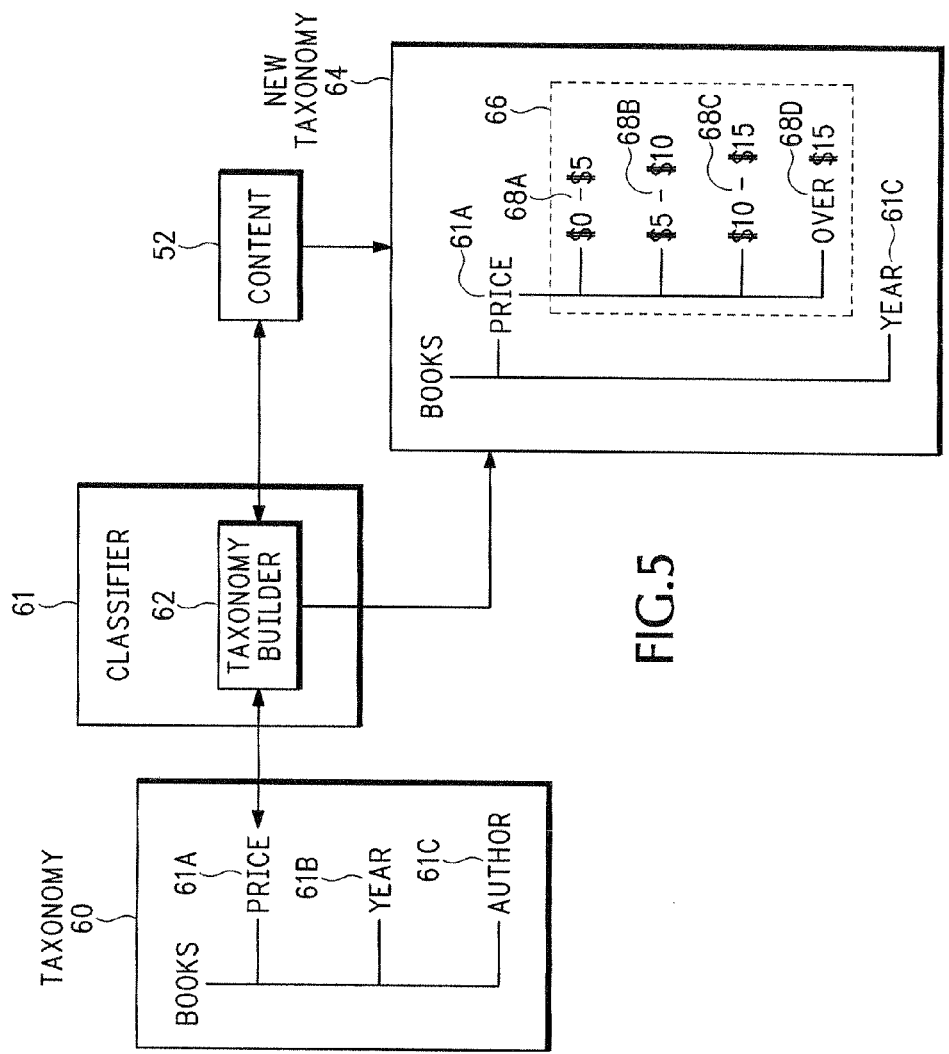
FIG. 5 shows a taxonomy builder used by a classifier to dynamically build taxonomies from content.
Figure 6:
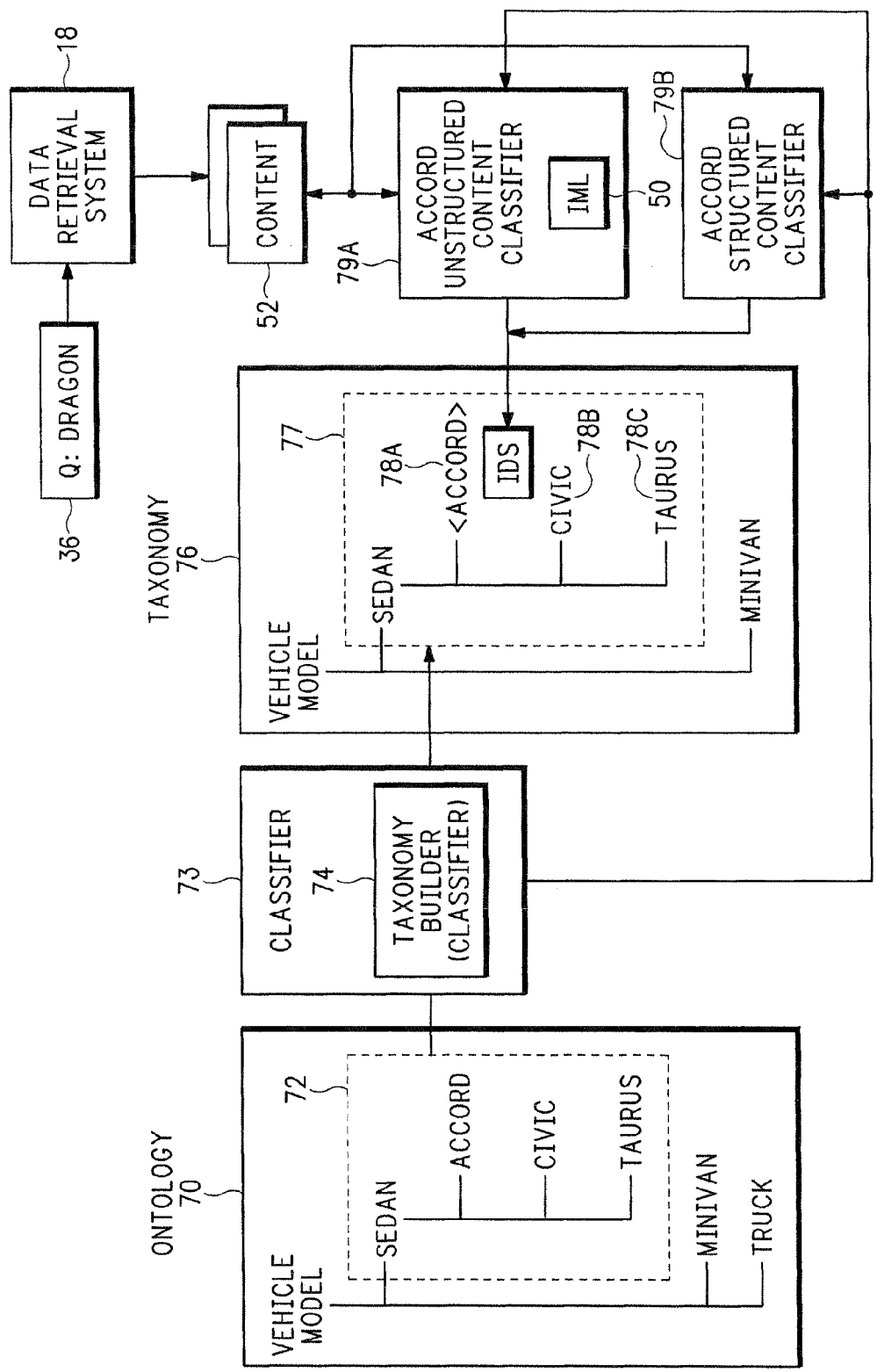
FIG. 6 shows how the taxonomy builder builds a taxonomy from an ontology.

FIGS. 5 and 6 show how classifiers can also, though taxonomy builders, automatically create a taxonomy below an associated facet. Sometimes it is difficult or impossible to create a taxonomy completely by hand. For example, it may be desirable to classify a database based on a "category" and a "subcategory" field. One way to do this would be to create each facet by hand and add a classifier to select the appropriate rows out of the database. However, this may require hundreds of facets in such a taxonomy that, furthermore, might need to be changed at any notice when there is a database format change.

For this reason, some classifiers may not just identify the content associated with a particular facet, but may also further subdivide the identified content 52 into subparts. This is performed by a taxonomy builder. Alternatively, a custom taxonomy builder can be built and used. The taxonomy builder takes the data from a classifier and uses it to construct a new taxonomy that is attached underneath an existing facet. Each time the content is classified, this taxonomy is reconstructed based on any new information.

For example, FIG. 5 shows one example where an existing taxonomy 60 may include price, year, and author facets 61A, 61B and 61C, respectively, as described above in FIG. 4. However, the price facet 61A may not have the sub-category facets 35A, 35B, and 35C that previously existed in FIG. 4. Alternatively, a taxonomy builder 62 is used by a classifier 61 associated with the price facet 61A. The classifier 61 searches content 52 for any documents that identify the price of books.

The procedures in the taxonomy builder 62 then automatically classify any identified content into different sub-categories such as $0-$5, $5-$10, $10-$15, etc. The taxonomy builder 62 then generates a taxonomy 66 under price facet 61A that includes new facets 68A-68D associated with different price ranges. The taxonomy builder 62 can then attach the newly created taxonomy 66 under the general price facet 61A previously created in taxonomy 60. The classifier 61 then classifies the content 52 for each newly built facet 68.

FIG. 6 shows another example of a taxonomy builder 74 used by a classifier 73. The taxonomy builder 74 uses an ontology 70 for automatically building a taxonomy 76. The ontology 70 is a hierarchical representation of a particular concept or subject matter. In one example, the ontology 70 is generated based on analysis of questions that may have been submitted to a particular enterprise site. Alternatively, the ontology 70 is a generic association of different meanings and words that may be associated with a particular concept. The use of the ontology 70 is explained in further detail in the co-pending application Ser. No. 10/820,341, which has been incorporated by reference. The ontology 70 may have been previously created for use by the data retrieval system 18 for retrieving content 52 in response to question 36.

In this example, the same or a similar ontology 70 is also used for classifying the content 52 that was identified by the data retrieval system 18. The ontology 70 in this example is associated with the concept "vehicle model". The vehicle model concept may have multiple different categories, such as sedan, minivan, truck, etc. Under the sedan concept there may be multiple different sub-concepts that include Accord, Civic, and Taurus, etc.

Any concept or sub-concept can be referred to in IML 50. For example, the sub-concept Accord may be referred to as <Accord> using the IML 50. As described above, the IML 50 is used in the classifiers to automatically identify other words and phrases associated with the concept <Accord>.

The taxonomy builder 74 uses all, or a portion of the ontology 70, to automatically build a taxonomy 76. In this example, the taxonomy builder 74 extracts a section 72 of ontology 70 and inserts it into an associated sedan section 77 of vehicle model taxonomy 76. In this example, each sub-category in section 72 of ontology 70 is converted into an associated facet 78 in taxonomy 76.

The taxonomy builder 74 then automatically builds classifiers 79 for each of the automatically created facets 78A-78C in taxonomy 76. For example, an Accord unstructured content classifier 79A may be built by taxonomy builder 74 to classify unstructured data in content 52 associated with the concept <Accord> specified by facet 78A. Classifier 79A may be built by taxonomy builder 74 to use IML 50 to search for the concept <Accord> in the unstructured data in content 52. The taxonomy builder 74 may also automatically create an Accord structured content classifier 79B to classify structured data in content 52 associated with the Accord facet 78A. Other classifiers may similarly be generated for the other automatically created facets 78B and 78C.

Intra-Document Classification

As described above, the navigation system 20 is not restricted to documents as the only level of search granularity. Content can also be classified in sentences, sections, or any other arbitrary document portion. This is especially useful for taxonomies or facets that are heavily represented in the content. For instance, an insurance company might have many documents that each discuss different types of insurance. With document level classification, the user can restrict the query to, say, auto insurance but still get many other documents discussing other different types of unrelated insurance. For example, auto insurance may still appear inconsequentially somewhere in many documents. With intra-document classification, a sentence or section specification increases the likelihood that all returned results are associated with auto insurance.

Figure 7:
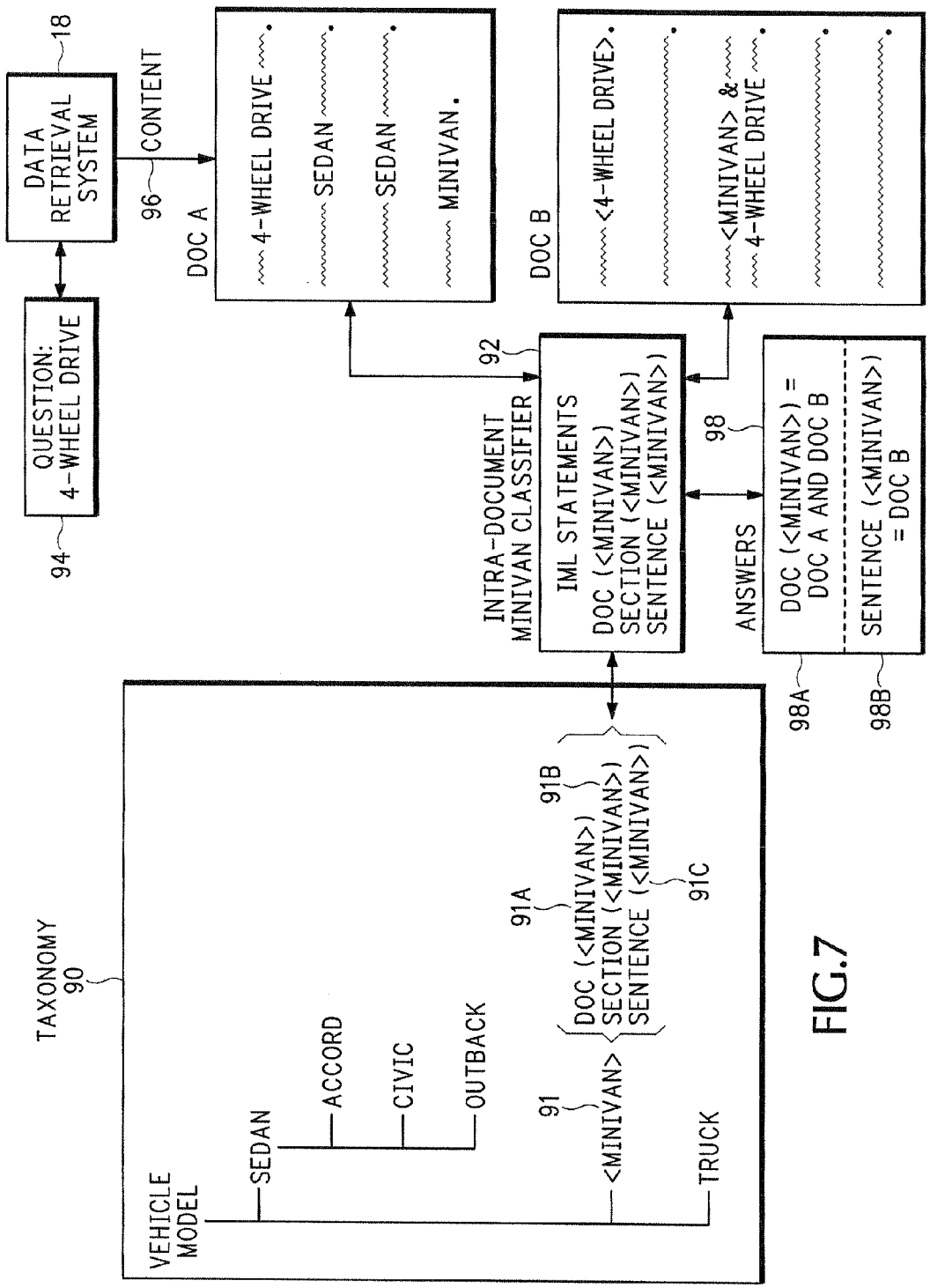
FIG. 7 shows how the navigation system can be used for intra-document classification.

To explain further, FIG. 7 shows a taxonomy 90 that is associated with vehicles. The taxonomy 90 may have different vehicle model categories that, in this example, include sedans, minivans and trucks. Any of the section or subsection facets can be specified at different intra-document granularities. For example, the facet 91 associated with the concept "minivan" may be defined on a document, section, or sentence intra-document granularity. Of course other intra-document granularities can also be used and the three granularities described here are just examples.

The minivan document facet 91A is used by classifier 92 to identify any document in content 96 that contains the concept <minivan> in a manner similar as discussed above. However, the section facet 91B causes the classifier 92 to only identify document sections that contain the concept <minivan>. A document section could be defined for example as a paragraph, a grouping of text separated from other text by a line space, or any other delineation between groups of text. The sentence facet 91C only identifies sentences in content 96 containing the concept <minivan>. In the cases of sections and sentences, only answers that overlap these sections and sentences are shown to the user if that facet is selected.

To explain further, a user enters the text question "4-wheel drive". The data retrieval system 18 retrieves content 96 that includes document A and document B. One or more intra-document classifiers 92 are associated with the minivan facet 91 and produce different results 98 depending on the intra-document classification used in facet 91.

For example, the minivan document classification facet 91A may be analyzed as the IML statement DOC (<minivan>) by classifier 92. Accordingly, classifier 92 identifies all documents in content 96 that include the concept <minivan>. In this example, both document A and document B would be identified in results 98A, since the concept minivan is contained in both 4-wheel drive documents.

The minivan sentence classification facet 91C is analyzed as the IML statement SENTENCE (<minivan>) by classifier 92. Classifier 92 identifies all sentences in content 96 that include the concept <minivan>. In this example, only document B includes both the concept <minivan> and the concept <4-wheel drive> in the same sentence and thus that answer, and not document A, is shown. Similar classification is used for the minivan section classification facet 91B where an IML statement SECTION (<minivan>) is used by classifier 92 to identify any sections within documents that contain the concept <minivan>.

Facet Expansion

In many query systems, it is difficult to back out of selections. The navigation system 20 (FIG. 1) allows a user to back out of a selection at any time to any level. The user can also expand the scope of a natural language query. For example, the user may enter the query "What books were published in 1992". After receiving search results, the user could then easily expand the scope of the query to include books published between 1990-1999. In another example, the navigation system 20 may receive a question for a particular car model. The navigation system 20 may identify content for different types of sedans. The user can then expand the scope of the query to other types of sedans after asking a first more specific question related to a particular car model.

Figure 8:
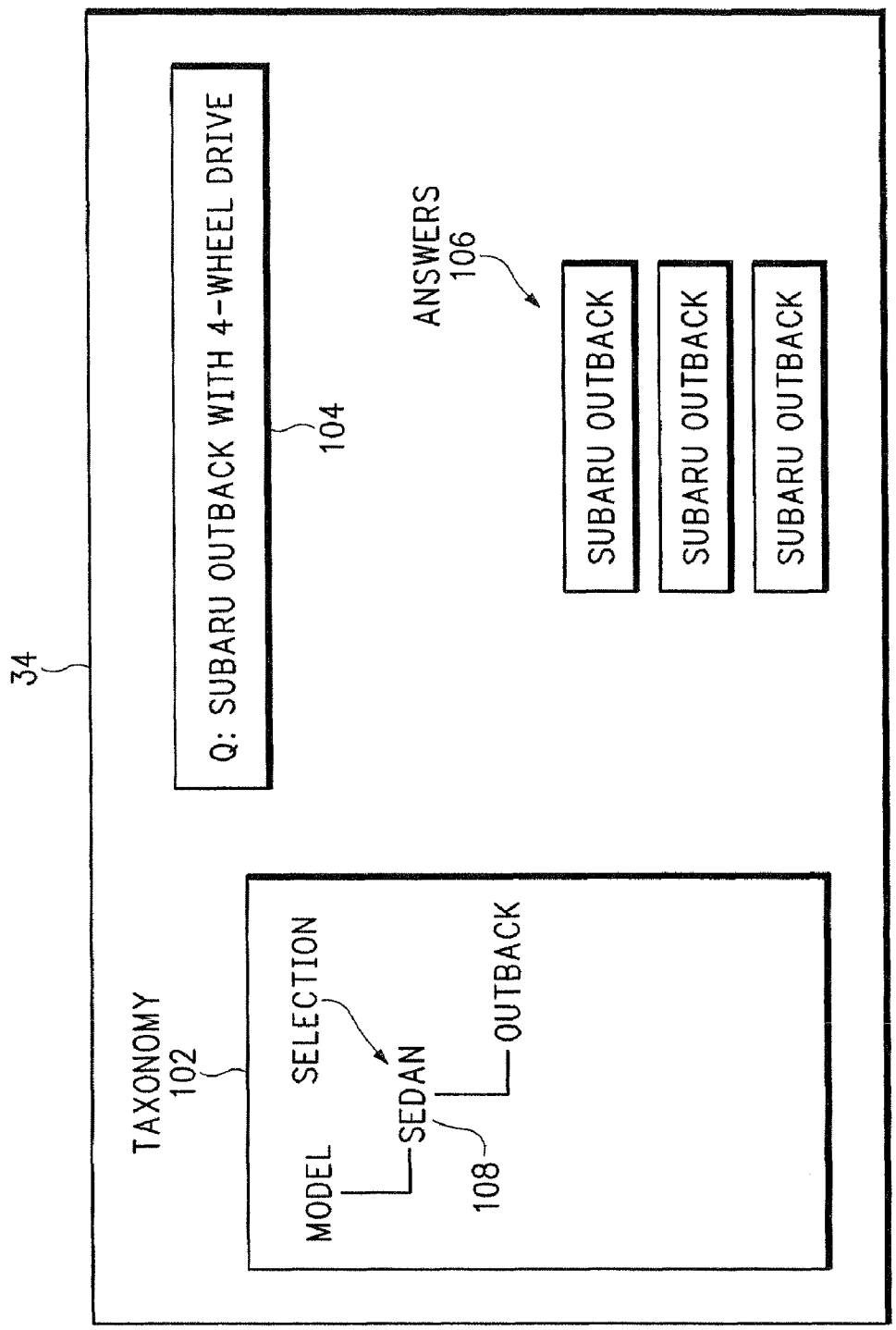
FIGS. 8 and 9 show how the navigation system allows a user to expand a previous search request.

FIG. 8 shows an example. A user may enter a question 104 via the UI 34, such as SUBARU OUTBACK WITH 4-WHEEL DRIVE. As discussed above, a data retrieval system 18 (FIG. 4) then searches one or more enterprise databases 16 and/or other sources on the Internet 22 for content associated with the question 104. The content is then displayed as answers 106.

In addition to the answers 106, the navigation system also displays a taxonomy 102 that is related to the question 104. In this example, the question is related to a particular vehicle model. Accordingly, the navigation system may present a model taxonomy 102 that includes the facets sedan and Outback, since Outback was requested by the question and sedan is its parent.

The navigation system provides the substantial advantage of allowing the user to then automatically expand the previous search by selecting one of the displayed facets. For example, the user may then select the facet 108 related to the broader category of sedans.

Figure 9:
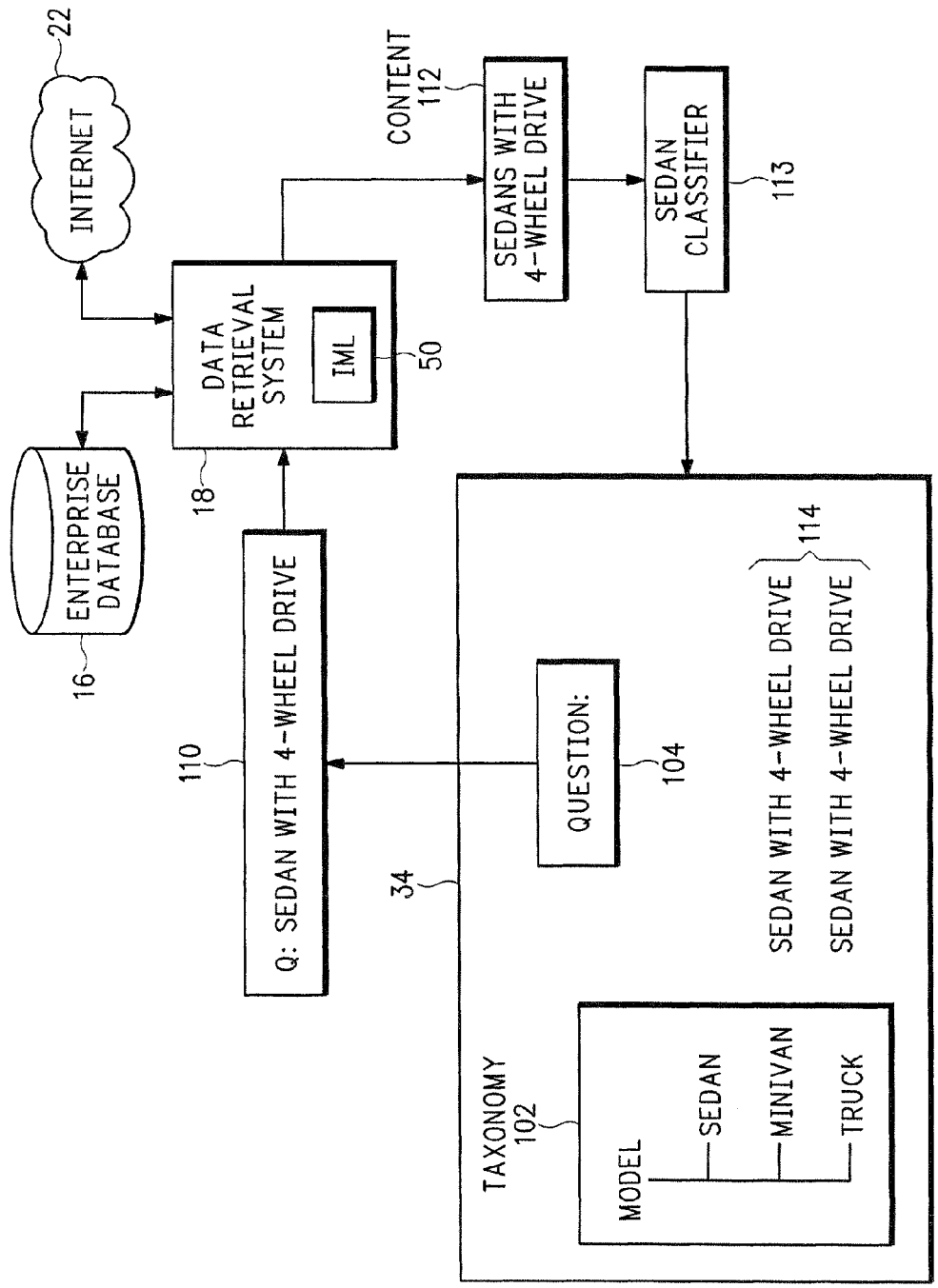

Referring to FIG. 9, the navigation system automatically rewrites the previous question to correspond to the selected facet 108. For example, the navigation system may rewrite the previous question SUBARU OUTBACK WITH 4-WHEEL DRIVE as a new question 110 that specifies SEDAN WITH 4-WHEEL DRIVE. The navigation system then automatically resubmits the rewritten question 110 to the data retrieval system 18. The data retrieval system 18 may use the IML 50 to then conduct a new natural language query for content in the enterprise database 16 and possibly for other content located on the Internet 22. The new identified content 112 associated with sedans having 4-wheel drive may then be further classified by an associated sedan classifier 113 before being displayed as answers 114 on UI 34. Optionally, the UI 34 may display the automatically rewritten question 110.

Parasitic Classification

The navigation system can take advantage of classifications in one data source to help classify content in other data sources. For example, an enterprise may have overlapping structured and unstructured content. For instance, a book database may contain a structured price list and may also include reviews for some of the books identified in the price list. The navigation system 20 can not only classify both the structured and unstructured content from different databases but can use the structured book list database to further classify the unstructured content.

The navigation system may use a first structured classifier to identify books in the structured database within specific price ranges. The structured classifier does this by identifying book prices in a preconfigured price field. The classifier can then use other classifications in the structured database, such as the book title field, to identify books referred to in the non-structured content that are within the same price range.

For example, the classifier can identify the titles in the structured database for all books within a particular price range. The identified book titles are then used by an unstructured classifier to identify similar book titles in the unstructured content. These book titles are then classified as being within the same price range as the books identified in the structured content, even though the unstructured content may not identify or include a book price.

Figure 10:
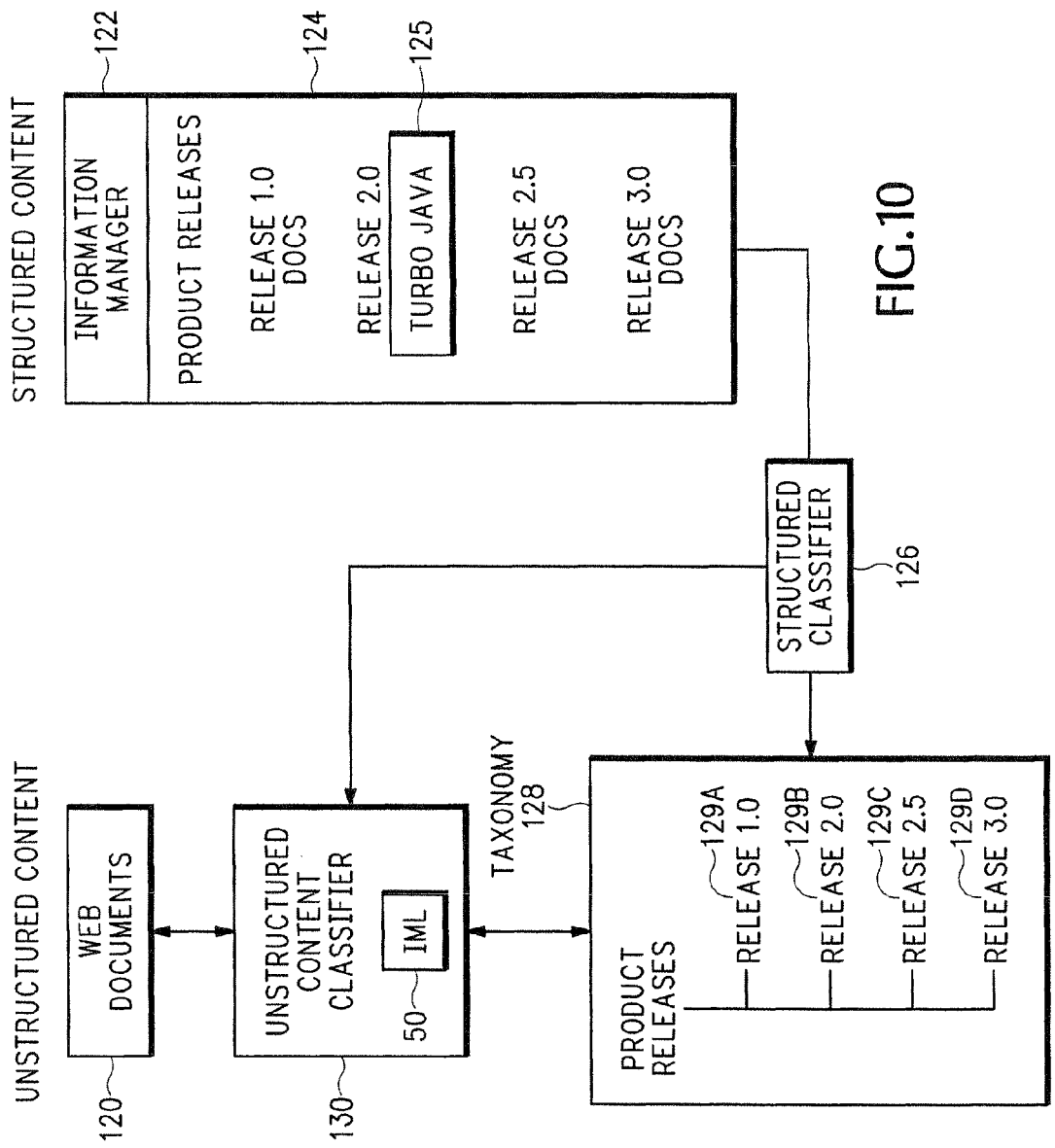
FIG. 10 shows a parasitic classification scheme used in the navigation system.

To explain further, FIG. 10 shows an information manager 122 that manages content, such as information related to different software releases. Different software products and related documents may be classified into different release versions 1.0, 2.0, 2.5, 3.0, etc. The content in information manager 122 is considered at least partially structured since the data 124 is arranged into preconfigured version categories.

Also shown in FIG. 10 is unstructured content 120 that may contain different web documents that are also related to the same software product information contained in the information manager 122. This information 120 is considered unstructured since it is not preconfigured into a predefined format or category groupings.

A structured classifier 126 generates a taxonomy 128 corresponding with the categories defined in structured content 124. For example, the taxonomy 128 may contain facets 129 that correspond to the different product release categories contained in structured content 124. The structured classifier 126 may then identify the data items in structured content 124 that are associated with each release facet 129A-129D. For example, the classifier 126 may identify a document 125 contained in category "release 2.0" of content 124. The document 125 may describe a product referring to "turbo java". Accordingly, the structured classifier 126 classifies the document 125 under the release 2.0 facet 129B.

Other classifiers, such as unstructured classifier 130, may then be associated with the facets 129 generated by structured classifier 126. The unstructured classifier 130 is created by the structured classifier 126 to search the unstructured content 120 for any information associated with the facets 129 generated from the structured content 124. For example, classifier 130 may search unstructured content 120 for any data items associated with the release 2.0 facet 129B. The unstructured classifier 130 may also use the IML 50 to identify any unstructured content 120 associated with concepts identified by the facets 129.

The classifier 130 can also be used to classify other content related to the facets 129. For example, a document in unstructured content 120 referring to "turbo java" may be classified under release 2.0 facet 129B due to the previous classification of the turbo java document 125 under the release 2.0 facet 129B by structured classifier 126. It should also be understood that the taxonomy classification could also be generated from unstructured content and then used to classify content in other unstructured or structured content.

Configurable Classifiers

Figure 11:
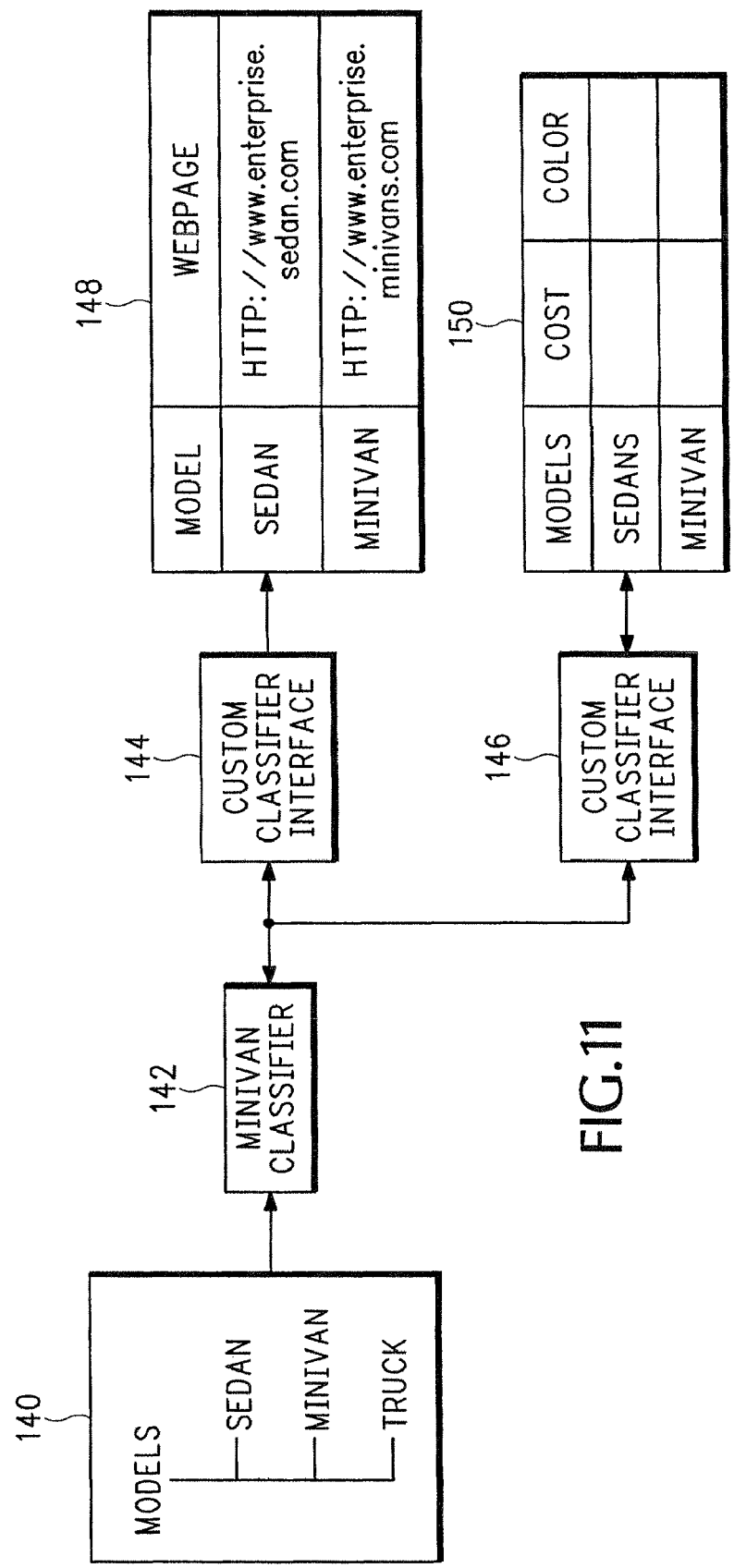
FIG. 11 shows how custom classifier interfaces are used with the classifiers.

FIG. 11 shows how classifiers can be customized for different database formats. For example, a taxonomy 140 and associated classifiers 142 may be developed for classifying a particular subject matter, such as cars. However, the content may be formatted differently for different databases 148 and 150 used by the same or different enterprises. For example, structured content 148 may associate different vehicle categories with different web pages. Other structured content 150 may format vehicle categories in a conventional column and row format.

Different custom classifier interfaces 144 and 146 convert the formats used in different content 148 and 150, respectively, into a common format that can then be used by the same classifier 142. The classifier 142 can then classify both the content 148 and content 150 with associated facets in taxonomy 140. This prevents having to write different classifiers 142 for each different content format. Configurable classifiers are not restricted to structured data and may also be applied to unstructured data of any form.

Ontology/Result Based Classification

Figure 12:
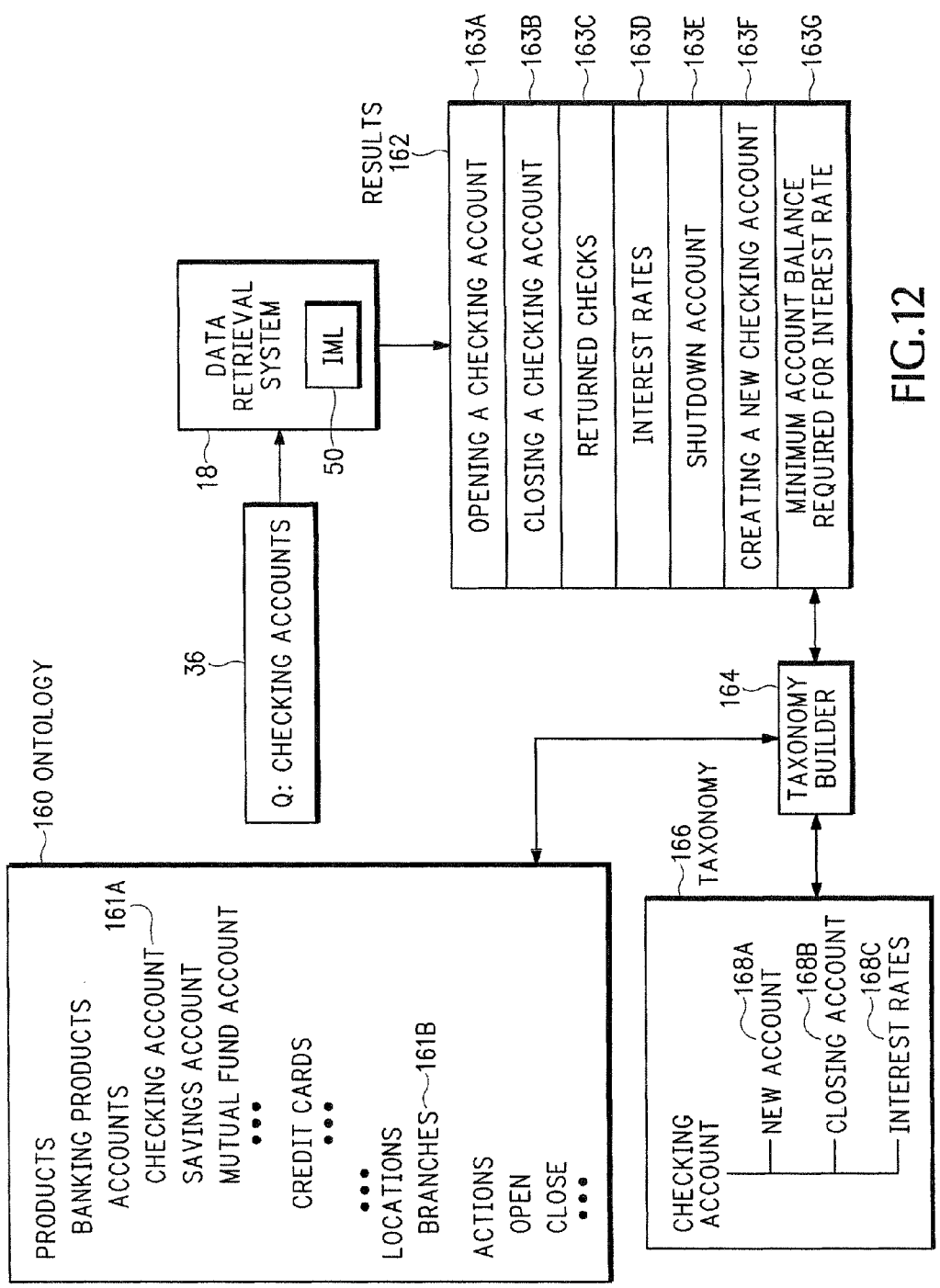
FIG. 12 shows another example of how an ontology is used in combination with search content to automatically build a taxonomy.

Referring to FIG. 12, the navigation system may automatically and dynamically generate taxonomies according to both returned results and a predetermined ontology. For example, a preconfigured ontology 160 may be associated with financial services. As described above, the ontology 160 could be manually generated according to empirical data, such as analysis of email questions received by a financial institution. In this example, the ontology 160 identifies different concepts associated with banking products. For example, these include different types of checking and savings accounts, branch locations, and actions such as opening or closing an account.

A user may enter the question CHECKING ACCOUNTS via the UI 30 (FIG. 2). The data retrieval system 18 then retrieves content 162 from different databases using the IML 50. The content 162 may include different data items 163 that have some association with checking accounts. Some of the data items 163 may refer to a similar subject but use different terminology. For example, data item 163A refers to opening a checking account and data item 163F refers to creating a new checking account.

Simply using a taxonomy generator to identify common terms in the data items 163 and then creating an associated taxonomy may not yield the most effective content classification. For example, the taxonomy generator could create two separate facets, one for opening checking accounts and another for creating new checking accounts. This could be confusing when viewed by the user.

Alternatively, the classifier 164 may not create a facet associated with new checking accounts because many of the data items use slightly different terminology when referring to the same general subject matter. Accordingly, the classifier 164 would not associate the content in any of the data items together and determine that there are not enough data items associated with any one of these terms to create a facet category.

To resolve this issue, the taxonomy builder 164 also refers to the ontology 160 when creating taxonomy 166. The taxonomy builder 164 analyzes the text of the results 162 as well as the concepts and other linguistic aspects in ontology 160. The concepts in ontology 160 may have different levels. For example, there may be customer concepts, industry concepts and language concepts. Certain concepts, such as customer concepts may be more important than industry concepts or language concepts. The taxonomy builder 164 compares the ontology 160 with the results 162 and builds a taxonomy 166 according to the comparison. For example, the taxonomy builder 164 may use known clustering algorithms that assign scores to the different concepts and words in ontology 160 corresponding with results 162. The taxonomy 166 is then generated based on this scoring.

It should be understood that taxonomy 166 is dynamically generated at run time based on the search results from a query. Other static taxonomies may also be used in the navigation system and created offline prior to operation.

To explain further, both the opening of a checking account referred to in data item 163A and creating a new checking account referred to in data item 163F may each be associated with a CHECKING ACCOUNT category 161A in ontology 160. If enough similar data items 163 are associated with one of the same ontology category 161A, the classifier 164 may create a corresponding new account facet 168A in taxonomy 166.

Similarly, the taxonomy builder 164 may also generate a closing account facet 168B when enough data items 163 are associated with closing or shutting down a checking account and generate an interest rate facet 168C when enough data items 163 are associated with checking account interest rates. Note that content 162 has little or no data items associated with branch location category 161B in ontology 160. Accordingly, the taxonomy builder 164 does not create a corresponding facet in taxonomy 166. Thus, the ontology 160 and results 162 actually play off each other to create a better taxonomy classification.

Rules Based Facet Restriction

Rules can determine which facets are selected for classifying content. Users are not required to select facets in a taxonomy to allow particular facets to take effect. Rules allow the taxonomy to operate simply by the user asking a question. Rules can also be used to automatically select facets in the taxonomy according to different questions, even if the question does not exactly match an existing facet.

The rules include conditions that can refer to particular concepts in a question or particular types of users asking the question. Actions contained in the rules can then initiate a search for a particular concept or show a particular answer. The actions contained in the rules can also be used to manipulate facet restrictions.

Figure 13:
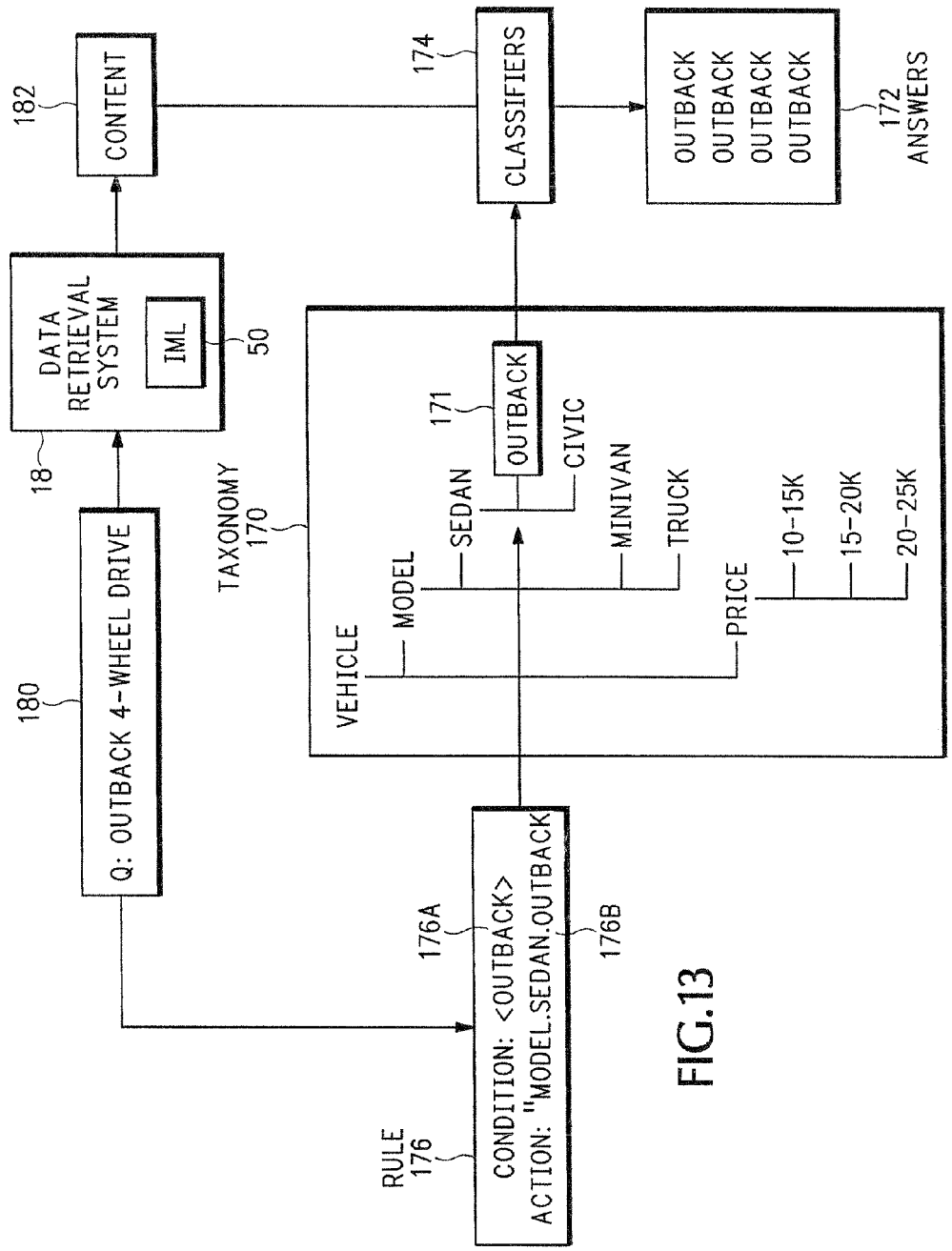
FIGS. 13-16 show how rules are used to control different navigation operations.

FIG. 13 shows one example of a rule that translates questions into facet restrictions. In this example, a question 180 OUTBACK 4-WHEEL DRIVE is entered by a user. The data retrieval system 18 then identifies content 182 associated with question 180. The navigation system also includes a taxonomy 170 that includes model facets associated with sedans, minivans and trucks as described above. Another section of the taxonomy 170 may also include pricing facets.

A rule 176 includes a condition 176A and an associated action 176B. In this example, the question 180 triggers the condition 176A in rule 176. For example, the condition 176A is premised on the concept <Outback> existing in the question 180. Note that a concept does not require the exact word "Outback" be used in the question 180 and only requires a word or phrase that is associated with the concept <Outback> as identified by an IML 50.

If the concept <Outback> exists in the question 180, the action 176B is triggered. In this example, the action 176B automatically restricts the search of content 182 to data items classified in a model.sedan.outback facet 171. Accordingly, only the answers 172 associated with the facet 171 are displayed.

Figure 14:
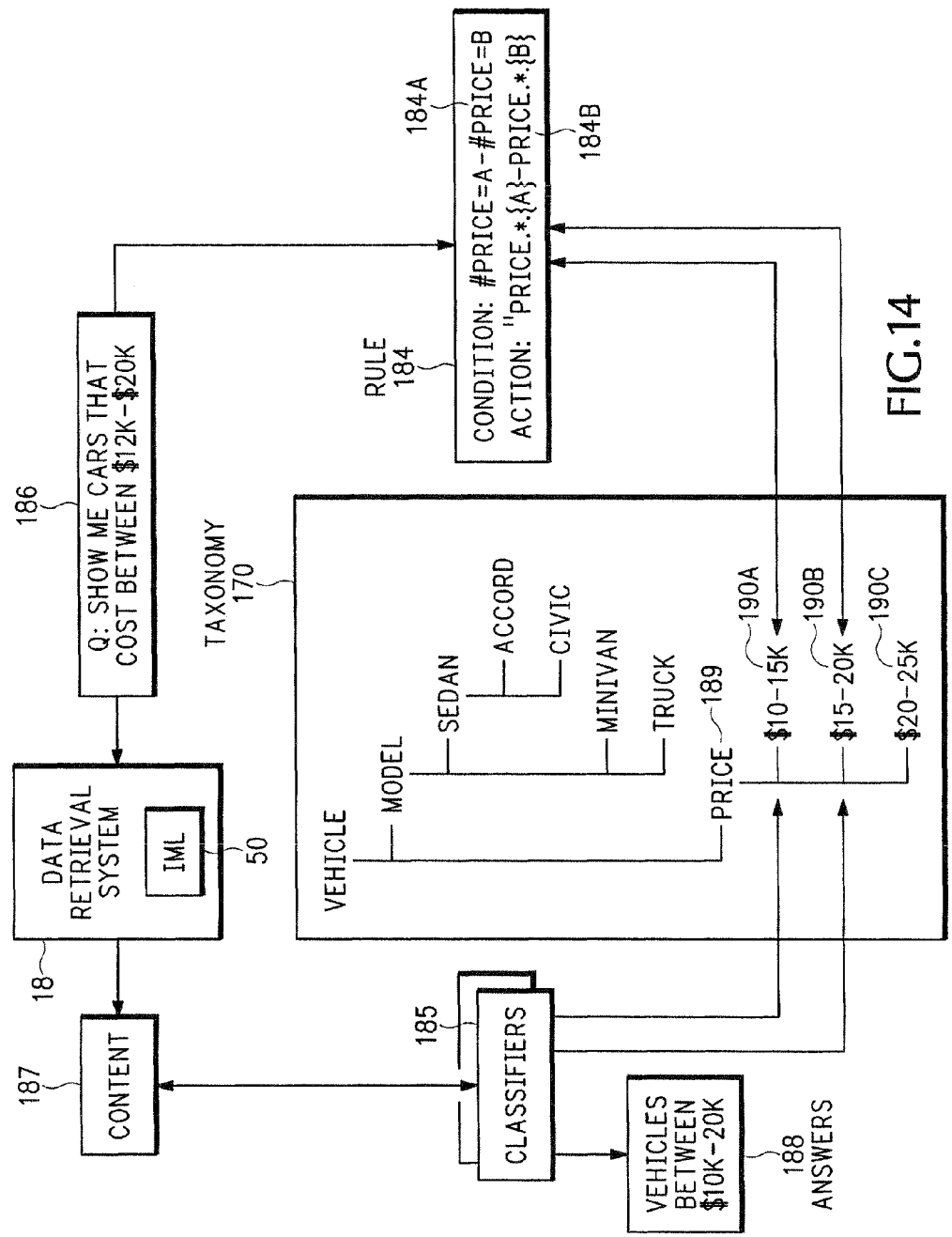

FIG. 14 shows another example where a rule 184 includes a condition 184A that extracts a price #price=A-#price=B from a question 186. The associated action 184B initiates a price classification between $12K and $20K using the facets in price taxonomy 189. However, there is not a one-to-one correlation between the price range in condition 184A and the values for the prices facets 190 in price taxonomy 189. For example, the prices facets 190 specify $5K prices ranges $10K-$15K, $15K-$20K, and $20K-$25K.

The navigation system will then find the price facets 190 that cover the price range identified in question 186. For example, price facets 190A and 190B cover the entire specified price range of $12K-$20K. Accordingly, the price facets 190A and 190B are automatically selected in response to question 186 and the answers 188 classified from content 187 will only include vehicles having a price range of between $10K-$20K.

Figure 15:
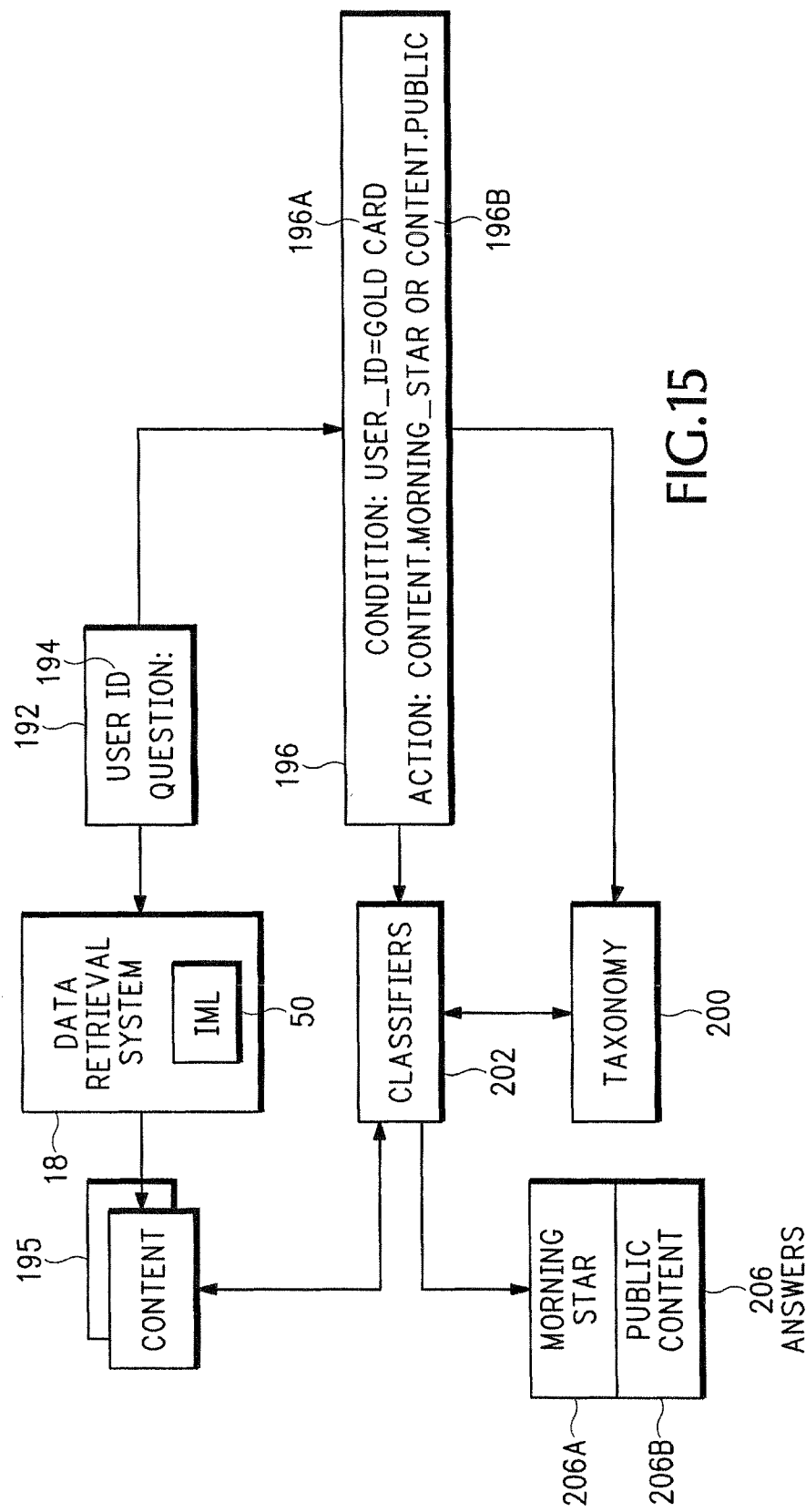

FIG. 15 shows another application for a navigation rule that associates particular actions with the type of user asking the question 192. For example, the rule 196 may have a business related condition 196A that is satisfied when the USER_ID associated with the user asking the question 192 is a gold card member. If the condition 196A is satisfied, the action 196B enables the display of answers 206B from both publicly available content and also answers 206A from subscription based morning star content. If the USER_ID is not associated with gold card membership in condition 196A, then only the public content is displayed in answers 206.

Figure 16:
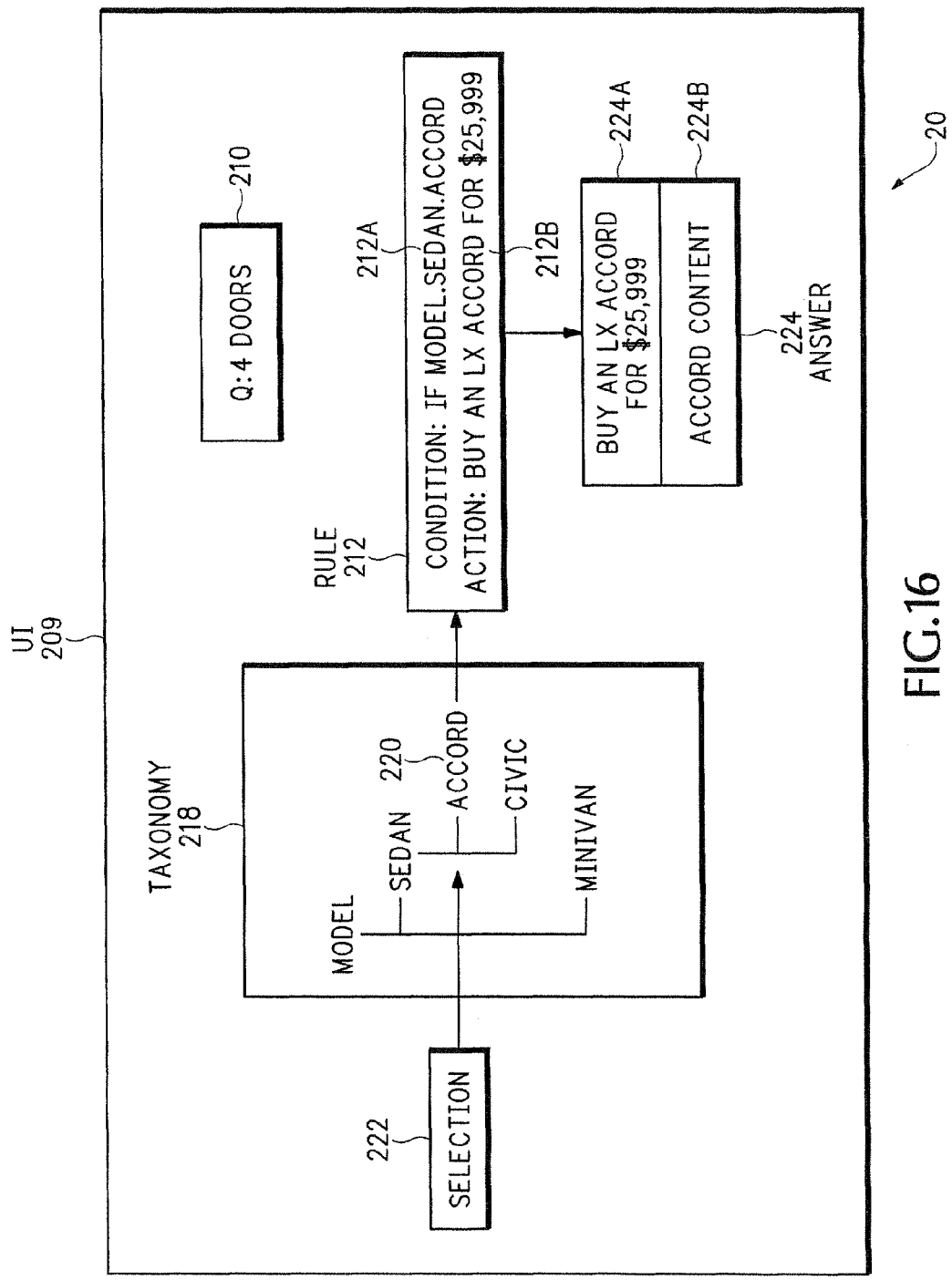

FIG. 16 shows yet another application of the navigation rules that display specific content according to facet selection. In this example, a rule 212 includes a condition 212A requiring selection of a particular Accord facet 220 in a vehicle model taxonomy 218. If a user satisfies condition 212A by selecting facet 220, the action 212B in rule 212 causes the navigation system 20 to display an advertisement 224A for a particular type of LX Accord in answer 224.

Accordingly, a user may enter a question 210 and associated answers are displayed on the user interface 209. The user may then make a selection 222 for facet 220. The navigation system displays content 224B classified with Accord facet 220 and also displays the content in action 212B. In this case, the content in action 212B is an advertisement associated with facet 220.

Alternate Display Formats

Figure 17:
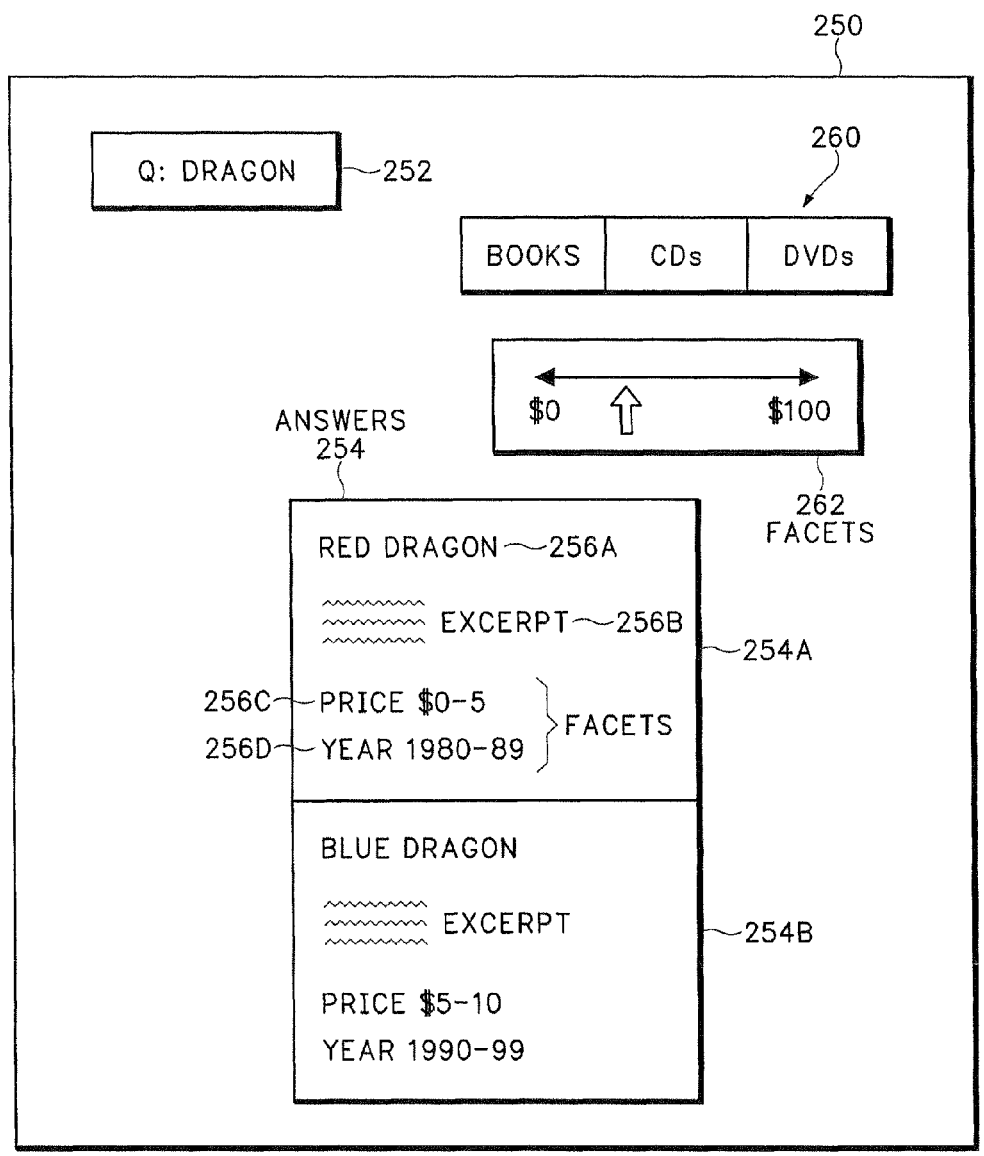
FIG. 17 shows an alternative scheme for displaying both search answers and taxonomies on the User Interface.

FIG. 17 shows alternate ways that results and taxonomies can be displayed on a user interface. In this example, the same question DRAGON is entered by the user. Instead of the results being displayed in one section and the associated taxonomy displayed in a separate section, the answers and facets that the content is classified under are displayed together.

For example, the DRAGON question 252 is processed by the data retrieval system 18 described above. Some of the content from the data search is displayed as answers 254A and 254B. The answer 254A includes some of the same content that may be contained in the answers described above. However, the answer now also includes facets 256 and that have been classified with the content.

For example, a classifier may have classified the content 256A and 256B with a $0-$5 price range facet 256C. Accordingly, the facet 256C is displayed along with content 256A and 256B. Similarly, the same, or another, classifier may have also classified the content 256A and 256B with a 1980-1989 publication date facet 256D. Accordingly, the facet 256D is displayed along with the content 256A and 256B and facet 256C. Selecting the facet 256C or 256D in answer 254A operates in the same manner as the facets described above. Thus, selecting the year 1980-89 facet 256D would display answers for books published between the years 1980-89. Other answers, such as answer 254B, may display other facets that are associated with the corresponding content.

One of the advantages of this format is that the user is immediately notified that the book identified in answer 254A is within a price range of $0-$5 dollars and published between the years of 1980-1989. This is displayed in answer 254A without ever clicking on a price range facet or clicking on a particular publication year facet.

In another variation, different taxonomy categories 260 may be displayed on the user interface 250. The user can then select which taxonomies and search content is displayed as answers 254. An analog facet display 262 can also be used to select different sets of facets that correspond with the selected position on display 262.

Detailed Rule Description

The rules above are described below in more detail. Many of the descriptions below refer to the following taxonomies.
Taxonomy:
  Genre
    Fiction
      Mystery
      Romance
      Speculative
        Fantasy
        Science Fiction
    Non Fiction
      Biography
      History
      Science
  Price
    $0-$9.99
      $0-$4.99
      $5-$9.99
    $9.99-$19.99
      $10-$14.99
      $15-$19.99
    $20-$29.99
      $20-$24.99
      $25-$29.99

A facet can be automatically selected in a rule using an "Add Facet Restriction" item in an "Advanced" menu. This will create an action tab with two mechanisms for selecting facets. First, there is a text field in which the full name of the facet can be typed in quotes (e.g., "Genre.Fiction"). The appropriate facet within the tree shown below the text field can also be selected. Note that this tree may not be complete until the data is classified.

Multiple facets can be selected using rules. As with selecting one facet, multiple facets can be selected within an "Add Facet Restriction" action in either the text field or the tree. Within the text box, an IML expression can be written where the primary difference is that quotes text is interpreted as facet references rather than tokens.

Two facets, a and b, can be selected with the expression: "a" OR "b". If only results that were classified by both facets is desired, the following expression can be used: "a" OVERLAP "b". Note that "a" IS "b" will also work but only for exact matches. For example, all documents will be correctly returned that were classified as a and b. However, no match will occur for a document classified as a with a section classified as b. The OVERLAP operator will cause the section to be matched.

Selecting facets in the tree will produce an expression which is the intersection of the taxonomies and a union of the facets within the taxonomies. For instance, selecting Mystery, Fantasy, and $20-$29.99 in the genre taxonomy, will produce the expression:

("Genre.Fiction.Mystery" OR "Genre.Fiction.Speculative.Fantasy") OVERLAP "Price.$20-$29.99".

Facets may be selected in different rules. The navigation system 20 attempts to combine them in a reasonable way in the same order that the rules were analyzed. As long as the facet expressions are in the form of an intersection of unions and the unions are isolated to one taxonomy each, then facet expressions are combined to maintain that form. If a different type of expression is found, from that point on, expressions are combined using OVERLAP.

For example, consider the case where three rules fire with the following expression.

"a.b" OVERLAP ("x.y" OR "x.z")

"a.c" OVERLAP "1.2"

"a.b" OR "x.z"

The first two expressions conform to the standard expression style, so they combine into: ("a.b" OR "a.c") OVERLAP ("x.y" OR "x.z") OVERLAP "1.2". However, the third expression does not conform (it contains a union from two different taxonomies) and thus is merely appended with the OVERLAP operator: ("a.b" OR "a.c") OVERLAP ("x.y" OR "x.z") OVERLAP "1.2" OVERLAP ("a.b" OR "x.z"). Note that facets selected in a search rule only affect that search. Facets selected in other rules are combined and affect all subsequent searches.

A facet can be restricted for a particular search. Adding such a restriction within a search rule may apply just to that search and may, by default, be combined with the previous restrictions. An option can also be selected to not combine with previous restrictions. This is particularly useful for doing collection based facets which are not to be applied to structured searches.

A previous facet restriction can be over-ridden. A search rule may include the Facet Restriction action and also a checkbox which, when checked, causes the current restriction to replace previous restrictions.

Facet references can contain configurable wildcards if the full path of the facet is unknown. For example, it may not be exactly known where Fantasy is located in the genre taxonomy. Fantasy can be referred to using Genre.*.Fantasy. This returns the first facet in the genre taxonomy that has the name Fantasy using a standard breadth first search. In other words, the first, shallowest possible match, is identified. If there is no match, the facet will be removed from the expression.

The id for a facet may not be known. This is sometimes the case with numeric or range based facets where the facet reference cannot exactly be expressed. Consider the taxonomy of prices. A rule can match prices and create a facet restriction such as Price.*.{price}. Unfortunately, individual prices may not exist in the taxonomy preventing a match. To find the most specific facet whose range contains the price, the following restriction can be used: Price.<>*.{price}. Note that this extension requires min/max values and a comparator to be specified for the facet. Some classifiers may do this automatically.

An approximate match may be generated for a facet. Sometimes a user may ask something like "Show me books around $15". If the facet reference Price.<>*.{price} is used, the facet $15-$19.99 may be returned back which is probably not the desired result. A similar case may exist when a user asks "What books were published in 1998?". The preferred response may not be 1998, but 1990-1999. This can be accomplished with the ~* wildcard.

For these two examples, that would be Price.*.$15 and Year.~*.1998. To be precise, this expression looks for a containing facet first. If the requested value is completely contained in the facet, then that facet is matched (e.g., both Price.<>*.$12 and Price.~*.$12 will match $10-$14.99). Otherwise, the parent is matched. So, Price.~*.$15 will match $10-$19.99. Note that this extension has min/max values and a comparator to be specified for the facet. Some classifiers may do this automatically.

A range of facets can be selected. For example, a user may ask "What books cost between $0 and $22". This range can be requested in a facet restriction expression by using an *IML operator which is overloaded for this purpose. The following expression would be used: "Price.<>*.$0" * "Price.<>*.$22". This will cause the facets $0-$9.99, $10-$19.99, and $20-$14.99 to be selected. Note that this extension has min/max values and a comparator to be specified for the facet. Some classifiers may also do this automatically.

The user may also request a value that doesn't exist. In many cases, the best thing to do is nothing, and the facet restriction will be ignored. But sometimes, especially when the user has asked for a range, some action is required. For example, the user may have asked for books starting at −10 dollars. Alternatively, the user may be asking for books published starting at 1945 when there is only data starting at 1960.

The following wildcards can be used. The "<*" wildcard is equivalent to <>* but if no answer is returned, finds the closest match that is bigger than the requested value. For example, Price.<*.{price} matches $0-$4.99 if the {price} evaluates to $−10, $−3.19, $0, $2.37, etc. The ">*" operator is equivalent to <>* but if no answer is returned, finds the closest match that is smaller than the requested value.

The user can be restricted from seeing particular facets. A facet restriction can be set using ISNT. For example, the user should not see any non-fiction books, the following expression can be used: "Genre" ISNT "Genre.Non Fiction"

A user can be restricted to see only particular facets. For example, to restrict a user to only fiction books, rather than using "Genre.Fiction", the following operator can be used "RESTRICTED(Genre.Fiction)".

A facet may be selected in the rules and the user may then navigate to a more general facet, the navigation system may still search for the original facet. To solve this problem, the navigation system can "fix" the question by replacing the old facet referring text with the new. The user still sees the old question, but as far as the system is concerned, the question has been changed. A variable may be set on the facet restriction that corresponds to the part of the question that needs to be replaced.

For example, there may be a rule with the following language condition ("science fiction")=scifi. The facet restriction would then be "Genre.*.Science Fiction"=scifi. Now the navigation system can tell what part of the question was about science fiction and replace it with the appropriate information.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

The invention claimed is:

1. A method for classifying content, comprising:
receiving, at a processor and as part of performing a query:
first content from a database that organizes data in a preconfigured format, and
second content from outside the database;
providing a taxonomy having an entire set of displayed and non-displayed preexisting facets associated with different subject categories;
using, by the processor, a structured classifier to classify the first content with one or more of the preexisting facets in the taxonomy;
using, by the processor, a different unstructured classifier to classify the second content with one or more of the same preexisting facets in the same taxonomy;
using, by the processor, a rule comprising a condition in a regular expression language and an associated action triggered when the condition is satisfied;
matching, by the processor, the regular expression language of the condition with one or more words or concepts contained in the query;
restricting, by the processor, the one or more preexisting facets according the associated action of the rule; and
displaying, in response to the query, the unrestricted one or more preexisting facets classified with the first content from the database and classified with the second content from outside the database.

2. The method according to claim 1, wherein the structured classifier searches predetermined data fields or predefined locations in the first content for information associated with the preexisting facets.

3. The method according to claim 2, including using an Intelligent Matching Language (IML) in the unstructured classifier to search for data items in the second content corresponding with a concept identified by the preexisting facets.

4. The method according to claim 1, including:
assigning identifiers to data items in both the first and second content;
using the structured classifier to generate a list of the identifiers for the data items in the first content associated with the preexisting facets;
using the unstructured classifier to add the identifiers to the same list for the data items in the second content associated with the preexisting facets; and
displaying the number of data items in both the first and second content associated with the same preexisting facets by counting the number of identifiers in the list that are possible answers to the query.

5. The method according to claim 1, including:
identifying data items located in either the first or second content associated with a selected one of the preexisting facets;
automatically creating new facets that are configured as sub-categories for the selected one of the preexisting facets, the newly created facets generated from the data items identified in the first or second content and not previously existing anywhere in the entire displayed or non-displayed taxonomy prior to receiving the first or second content;
building a new taxonomy that includes the new facets that are sub-categories underneath the selected one of the preexisting facets; and
classifying the data items according to the new taxonomy.

6. The method according to claim 1, including:
associating an ontology with the first and second content that includes at least one concept having different categories and sub-categories;
inserting a portion of the ontology into the taxonomy; and
using the categories and sub-categories for the inserted portion of the ontology as facets for classifying the first and second content.

7. The method of claim 1, wherein the first content is a portion of a search result of the query, and wherein the search result that includes the first content is classified on a display using the respective preexisting facets.

8. The method of claim 1, wherein the first content is a portion of a search result, the portion being displayed in a particular preconfigured format.

9. The method according to claim 1, including:
identifying data items located in the first content associated with a selected one of the preexisting facets;
automatically creating new facets that are configured as sub-categories for the selected one of the preexisting facets, the newly created facets generated from the data items identified in the first content and not previously existing anywhere in the entire displayed or nondisplayed taxonomy prior to receiving the first content;
building a new taxonomy that includes the new facets that are sub-categories underneath the selected one of the preexisting facets; and
classifying the data items according to the new taxonomy.

10. A computer readable memory having instructions stored thereon that, in response to execution by a computing device, cause the computing device to perform operations comprising:
receiving both first content from a database that organizes data in a preconfigured format and second content from outside the database;
providing a taxonomy having facets associated with different subject categories;
using a structured classifier to classify the first content with one of the facets; and
using an unstructured classifier to classify the second content with the facet; wherein:
the structured classifier is enabled to use predefined fields in the first content, and
the unstructured classifier is enabled to classify the second content even though the second content does not have predefined fields;
using a rule comprising a condition in a regular expression language and an associated action triggered when the condition is satisfied;
matching the regular expression language of the condition with one or more words or concepts contained in a query; and
restricting the one or more taxonomy facets according the associated action of the rule.

11. The computer readable memory according to claim 10, wherein the structured classifier searches the predefined fields in the first content for information associated with the facet.

12. The computer readable memory according to claim 10, wherein the operations further comprise using an Intelligent Matching Language (IML) in the unstructured classifier to search data items in the second content corresponding with a concept identified by the facet.

13. The computer readable memory according to claim 10, wherein the operations further comprise:
identifying data items in the first content associated with the facet;

identifying different sub-categories for the identified data items;

building a new taxonomy by listing the sub-categories underneath the facet; and classifying the data items according to the new taxonomy.

14. The computer readable memory according to claim 10, wherein the operations further comprise:

associating an ontology with the first and second content that includes at least one concept having different categories and sub-categories;

inserting a portion of the ontology into the taxonomy; and using the categories and sub-categories for the inserted portion of the ontology as facets for classifying the first and second content.

15. The computer readable memory according to claim 14, wherein the operations further comprise:

building new classifiers for the facets created from the inserted portion of the ontology; and using the new classifiers to classify both the first and second content with the facets created from the inserted portion of the ontology.

16. The computer readable memory according to claim 15, wherein the operations further comprise:

conducting a query that returns search results;

comparing concept categories in the ontology with data items contained in the search results;

identifying the concept categories associated with the data items from the search results; and dynamically creating facets in the taxonomy according to the concept categories in the ontology corresponding with the search results.

17. A computing system, comprising:

a processor configured to receive both first content from a database that organizes data in a preconfigured format and second content from outside the database; and the processor to classify, using separate respective structured and unstructured classifiers, both the first and second content into categories identified in a same associated taxonomy;

wherein the structured classifier is enabled to use predefined fields in the first content, and the unstructured classifier is enabled to classify the second content even though the second content does not have predefined fields;

wherein the processor is further configured to independently operate both the structured and unstructured classifiers for the same taxonomy categories, the structured classifier classifying the first content for associated taxonomy categories and the unstructured classifier classifying the second content for associated taxonomy categories;

wherein the processor is configured to use a rule comprising a condition in a regular expression language and an associated action triggered when the condition is satisfied;

wherein the processor is configured to match the regular expression language of the condition with one or more words or concepts contained in a query; and wherein the processor is configured to restrict the one or more taxonomy categories according the associated action of the rule.

18. The computing system according to claim 17, including memory that contains lists associated with the taxonomy categories, the processor configured to classify data items in both the first and second content with the taxonomy categories and then store identifiers for the classified items in the lists associated with the taxonomy categories.

19. The method according to claim 1, wherein the first content is visually distinguished from the second content when displayed.

* * * * *

UNITED STATES PATENT AND TRADEMARK OFFICE
CERTIFICATE OF CORRECTION

PATENT NO.        : 8,296,284 B2
APPLICATION NO.   : 13/005459
DATED             : October 23, 2012
INVENTOR(S)       : Bierner Page 1 of 1

It is certified that error appears in the above-identified patent and that said Letters Patent is hereby corrected as shown below:

On page 3, in column 2, under "Other Publications", line 13, delete "Heildelberg," and insert -- Heidelberg, --, therefor.

In column 15, line 59, delete "Price.*.$15" and insert -- Price.~*.$15 --, therefor.

In column 16, line 29, delete "Fiction"" and insert -- Fiction". --, therefor.

In column 18, line 23-24, in Claim 9, delete "nondisplayed" and insert -- non-displayed --, therefor.

Signed and Sealed this
Twenty-second Day of January, 2013

David J. Kappos
*Director of the United States Patent and Trademark Office*